(12) United States Patent
Chimalamarri et al.

(10) Patent No.: US 12,393,269 B2
(45) Date of Patent: Aug. 19, 2025

(54) CALIBRATING A GAZE TRACKER

(71) Applicant: Apple Inc., Cupertino, CA (US)

(72) Inventors: Anshu K. Chimalamarri, Sunnyvale, CA (US); Bryce L. Schmidtchen, San Francisco, CA (US); Gregory Lutter, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/115,974

(22) Filed: Mar. 1, 2023

(65) Prior Publication Data

US 2023/0333642 A1    Oct. 19, 2023

Related U.S. Application Data

(60) Provisional application No. 63/409,293, filed on Sep. 23, 2022, provisional application No. 63/324,351, filed on Mar. 28, 2022.

(51) Int. Cl.
| | |
|---|---|
| *G06F 3/01* | (2006.01) |
| *G06T 7/20* | (2017.01) |
| *G06V 10/46* | (2022.01) |
| *G06V 10/56* | (2022.01) |
| *G06V 40/18* | (2022.01) |

(52) U.S. Cl.
CPC .............. *G06F 3/013* (2013.01); *G06T 7/20* (2013.01); *G06V 10/462* (2022.01); *G06V 10/56* (2022.01); *G06V 40/193* (2022.01)

(58) Field of Classification Search
CPC ......... G06F 3/013; G06T 7/20; G06V 10/462; G06V 10/56; G06V 40/193; G06V 10/25; G06V 10/98
See application file for complete search history.

(56) References Cited

U.S. PATENT DOCUMENTS

| | | | | |
|---|---|---|---|---|
| 11,294,455 | B2 * | 4/2022 | Sun ........................ | G06V 40/18 |
| 2011/0169730 | A1 * | 7/2011 | Sugihara ................ | G06F 3/013 |
| | | | | 345/156 |
| 2014/0354539 | A1 * | 12/2014 | Skogo ..................... | G06F 3/013 |
| | | | | 345/156 |

(Continued)

FOREIGN PATENT DOCUMENTS

| | | | | |
|---|---|---|---|---|
| CN | 111857333 | A * | 10/2020 | ............. G06F 3/013 |
| EP | 3511803 | B1 * | 11/2021 | ............. G06F 3/013 |

*Primary Examiner* — Michael Lee
(74) *Attorney, Agent, or Firm* — Fernando & Partners, LLP

(57) ABSTRACT

A method includes displaying a plurality of visual elements. The method includes determining, based on respective characteristic values of the plurality of visual elements, an expected gaze target that indicates a first display region where a user of the device intends to gaze while the plurality of visual elements is being displayed. The method includes obtaining, via the image sensor, an image that includes a set of pixels corresponding to a pupil of the user of the device. The method includes determining, by a gaze tracker, based on the set of pixels corresponding to the pupil, a measured gaze target that indicates a second display region where the user is measuredly gazing. The method includes adjusting a calibration parameter of the gaze tracker based on a difference between the first display region indicated by the expected gaze target and the second display region indicated by the measured gaze target.

20 Claims, 13 Drawing Sheets

(56) References Cited

U.S. PATENT DOCUMENTS

| | | | | |
|---|---|---|---|---|
| 2015/0085251 | A1* | 3/2015 | Larsen | G06F 3/013 |
| | | | | 351/206 |
| 2015/0199005 | A1* | 7/2015 | Haddon | G06F 3/013 |
| | | | | 345/163 |
| 2015/0331485 | A1* | 11/2015 | Wilairat | G02B 27/0172 |
| | | | | 345/156 |
| 2016/0009411 | A1* | 1/2016 | Davalos | G08G 5/0078 |
| | | | | 345/156 |
| 2017/0364149 | A1* | 12/2017 | Lu | G06F 3/013 |
| 2018/0004283 | A1* | 1/2018 | Mathey-Owens | |
| | | | | G06F 3/04842 |
| 2018/0074581 | A1* | 3/2018 | Melman | G06F 3/013 |
| 2020/0364539 | A1* | 11/2020 | Anisimov | G06F 3/011 |
| 2021/0294883 | A1* | 9/2021 | Kim | G06V 40/172 |
| 2022/0236797 | A1* | 7/2022 | Drozdov | G06V 10/82 |
| 2022/0397975 | A1* | 12/2022 | Iliffe-Moon | G06F 3/04886 |
| 2022/0400228 | A1* | 12/2022 | Sommerlade | H04N 7/144 |

\* cited by examiner

CALIBRATING A GAZE TRACKER

CROSS-REFERENCE TO RELATED APPLICATIONS

This application claims the benefit of U.S. Provisional Patent App. No. 63/324,351, filed on Mar. 28, 2022, and U.S. Provisional Patent App. No. 63/409,293, filed on Sep. 23, 2022, which are incorporated by reference in their entirety.

TECHNICAL FIELD

The present disclosure generally relates to calibrating a gaze tracker.

BACKGROUND

Some devices include a display that presents visual content. Some devices manipulate the visual content based on an input. Erroneous inputs can trigger a device to manipulate the visual content unexpectedly. Some devices perform various operations based on an input. Erroneous inputs may trigger the device to perform unpredictable operations.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
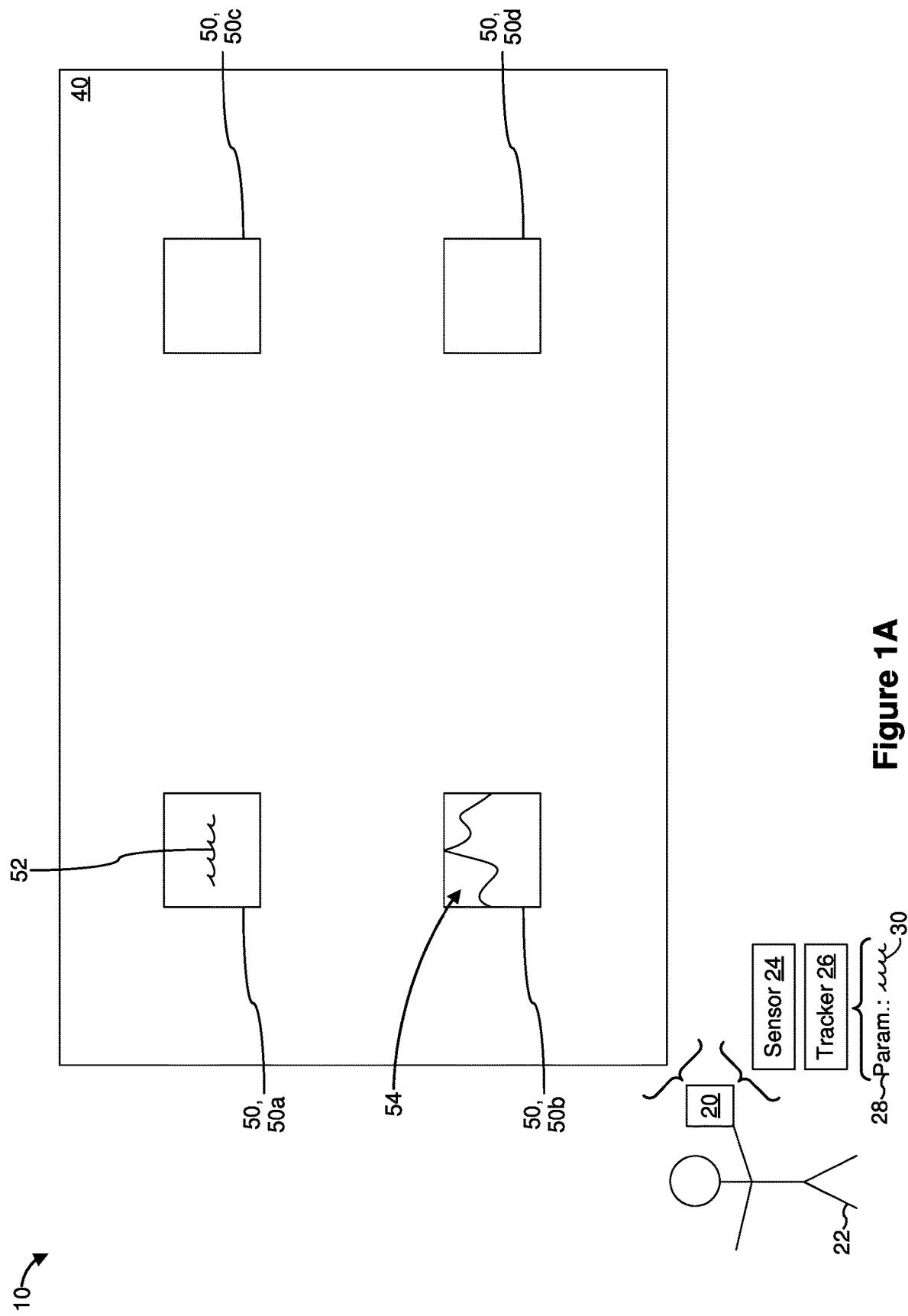
FIGS. 1A-1J are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for calibrating a gaze tracker. In some implementations, a device includes a display, an image sensor, a non-transitory memory, and one or more processors coupled with the display, the image sensor and the non-transitory memory. In various implementations, a method includes displaying, on the display, a plurality of visual elements. In some implementations, the method includes determining, based on respective characteristic values of the plurality of visual elements, an expected gaze target that indicates a first display region where a user of the device intends to gaze while the plurality of visual elements is being displayed. In some implementations, the method includes obtaining, via the image sensor, an image that includes a set of pixels corresponding to a pupil of the user of the device. In some implementations, the method includes determining, by a gaze tracker, based on the set of pixels corresponding to the pupil, a measured gaze target that indicates a second display region where the user is measuredly gazing. In some implementations, the method includes adjusting a calibration parameter of the gaze tracker based on a difference between the first display region indicated by the expected gaze target and the second display region indicated by the measured gaze target.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some devices utilize gaze as an input. Such devices include an image sensor and a gaze tracker. The image sensor captures a set of one or more images of a user of the device. The gaze tracker tracks a gaze of the user by identifying pixels that correspond to a pupil of the user. The gaze tracker determines a gaze direction based on the pixels that correspond to the pupil. The gaze tracker is calibrated so that the gaze tracker accurately tracks the gaze of the user in a reliable manner. While the device is being used, the calibration may need to be adjusted in order for the gaze tracker to continue tracking the gaze accurately. For example, a head-mounted device with an eye tracking camera is likely to slip or move around on the user's head during usage. In this example, an eye position relative to the eye tracking camera may change while the head-mounted device is being used. Too much of a change in the eye position relative to the eye tracking camera may lead to inaccurate gaze tracking.

The present disclosure provides methods, systems, and/or devices for adjusting a calibration of a gaze tracker while the gaze tracker is being used so that the gaze tracker continues to accurately track a gaze of a user. A device adjusts the calibration of the gaze tracker as a background operation while the device is being used to perform other operations. The device adjusts the calibration of the gaze tracker based on a difference between an expected gaze position and a measured gaze position. If the difference between the expected gaze position and the measured gaze position is greater than an acceptability threshold, the device adjusts a calibration parameter of the gaze position. The device adjusts the calibration parameter so that a difference between a subsequent expected gaze position and a corresponding subsequent measured gaze position is within the acceptability threshold.

The device can determine the expected gaze position based on a user input. As an example, when the user activates a button (e.g., a "Send" button in a messaging application) by pressing the button (e.g., via a physical input device such as a mouse, a keyboard, a touchpad, or a touchscreen), performing a gesture while gazing at the button, gazing at the button for a threshold length of time, or via a voice input (e.g., by saying "Send" or "Send the message"), the user is expected to gaze at the button. In this example, if the gaze tracker indicates that the user is gazing 10 pixels away from the button or gazing 10 pixels away from an expected portion of the button when the button is activated by pressing, gesturing, gaze dwelling, or via a voice input then the device determines that the gaze tracker is likely generating an erroneous gaze target. As such, the device adjusts a calibration parameter of the gaze tracker based on the error of 10 pixels. As another example, if the device is displaying a text string that the user is expected to gaze at and the gaze tracker indicates that the user is gazing 15 pixels away from the text string into a blank space then the device determines that the gaze tracker likely needs to be recalibrated and the device adjusts the calibration parameter of the gaze tracker based on the error of 15 pixels.

The calibration parameter may be a function of a location of an eye of the user relative to an image sensor of the device. Since the gaze tracker utilizes a value of the calibration parameter to generate a measured gaze target, the measured gaze target is a function of the location of the eye relative to the image sensor. If the device is a head-mounted device and the head-mounted device moves while the head-mounted device is mounted on a head of the user, the location of the eye relative to the image changes. Adjusting the calibration parameter compensates for the movement of the head-mounted device on the head of the user. The calibration parameter may include a value that indicates a position of the eye relative to the image sensor. Adjusting the calibration parameter may include changing the value to a new value that indicates a new position of the eye relative to the image sensor.

Adjusting the calibration parameter while the device is being used reduces the need for a dedicated re-calibration operation. For example, adjusting the calibration parameter as a background operation reduces the need for a re-calibration that is performed as a foreground operation where the device guides the user to perform certain operations in order to re-calibrate the gaze tracker. As an example, adjusting the calibration parameter during regular device usage reduces the need for a guided re-calibration operation where the device prompts the user to gaze at a particular visual element and re-calibrates the gaze tracker based on a difference between a measured gaze location and a position of the particular visual element.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20 and a user 22 of the electronic device 20.

In some implementations, the electronic device 20 includes a handheld computing device that can be held by the user 22. For example, in some implementations, the electronic device 20 includes a smartphone, a tablet, a media player, a laptop, a desktop computer, or the like. In some implementations, the electronic device 20 includes a wearable computing device that can be worn by the user 22. For example, in some implementations, the electronic device 20 includes a head-mountable device (HMD) or an electronic watch. In various implementations, the electronic device 20 includes an image sensor 24 that captures images of at least one eye of the user 22, a gaze tracker 26 that tracks a gaze of the user 22 based on the images captured by the image sensor 24, and a display that presents a graphical environment 40 (e.g., a graphical user interface (GUI) with various GUI elements). In some implementations, the electronic device 20 includes or is connected to a physical input device such as a mouse, a keyboard, a touch-sensitive surface such as a touchpad, a clicker device, etc. In some implementations, the display includes a touchscreen display that can detect user inputs (e.g., tap inputs, long press inputs, drag inputs, etc.).

In some implementations, the electronic device 20 includes a smartphone or a tablet, and the image sensor 24 includes a front-facing camera that can capture images of an eye of the user 22 while the user 22 is using the electronic device 20. In some implementations, the electronic device 20 includes an HMD, and the image sensor 24 includes a user-facing camera that captures an image of the eye of the user 22 while the HMD is mounted on a head of the user 22. In some implementations, the electronic device 20 is a laptop that includes a touch-sensitive surface (e.g., a touchpad) for receiving a user input from the user 22. In some implementations, the laptop is connected to a separate physical input device such as a mouse, a touchpad or a keyboard for receiving user inputs from the user 22. In some implementations, the electronic device 20 is a desktop computer that is connected to a separate physical input device such as a mouse, a touchpad or a keyboard for receiving user inputs from the user 22.

In some implementations, the gaze tracker 26 obtains a set of one or more images captured by the image sensor 24. The gaze tracker 26 identifies pixels that correspond to an eye and/or a pupil of the user 22. The gaze tracker 26 tracks the gaze of the user 22 based on pixels that correspond to the eye and/or the pupil of the user 22. In some implementations, the gaze tracker 26 generates a gaze target that includes a gaze position value, a gaze intensity value and a gaze duration value. The gaze position value indicates coordinates of a display region within the graphical environment 40 that the user 22 is gazing at. The gaze intensity value indicates a number of pixels that the user 22 is gazing at. The gaze duration value indicates a time duration for which the user 22 has been gazing at the display region indicated by the gaze position value.

In various implementations, the electronic device 20 calibrates the gaze tracker 26 so that the gaze tracker 26 accurately tracks the gaze of the user 22 in a reliable manner. In some implementations, the gaze tracker 26 is associated with a set of one or more calibration parameters 28 (hereafter "calibration parameter 28"). In such implementations, calibrating the gaze tracker 26 includes setting a value for the calibration parameter 28. In the example of FIG. 1A, the calibration parameter 28 has a first value 30. In some implementations, the first value 30 includes a default value. In some implementations, the first value 30 is a function of an expected position of an eye of the user 22 relative to the image sensor 24. For example, the first value 30 may correspond to the eye of the user 22 being aligned with the image sensor 24 (e.g., the eye intersects with an axis at a center of a viewing frustum of the image sensor 24). In other words, the first value 30 may represent that the eye is at a center of a field-of-view of the image sensor 24.

In some implementations, the graphical environment 40 includes a two-dimensional (2D) environment. In some implementations, the graphical environment 40 includes a three-dimensional (3D) environment such as an XR environment. In the example of FIG. 1A, the graphical environment 40 includes various visual elements 50 (e.g., a first visual element 50a, a second visual element 50b, a third visual element 50c and a fourth visual element 50d). In some implementations, the visual elements 50 include graphical objects (e.g., XR objects). In some implementations, the visual elements 50 include selectable affordances (e.g., buttons) that the user 22 can select by providing a user input (e.g., a touch input via a touchpad or a touchscreen, a mouse click input via a mouse, a key press input via a keyboard, a gaze input, a voice input via a microphone, etc.). In some implementations, the visual elements 50 include text 52 (e.g., a brief description of a functionality of the first visual element 50a). In some implementations, the visual elements 50 include a graphic 54 (e.g., an image, for example, a visual indication of a functionality of the second visual element 50b).

Figure 1B:
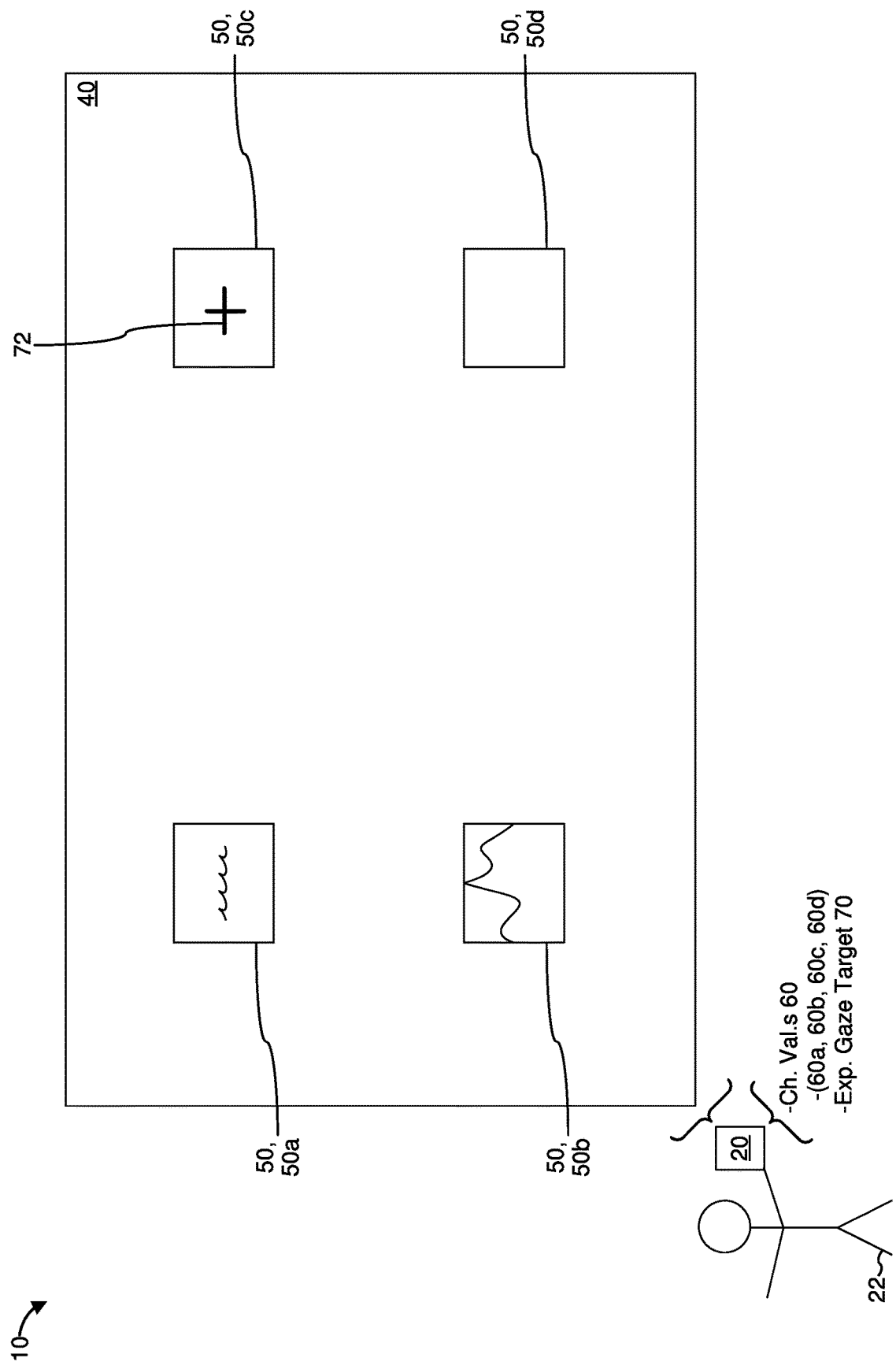

Referring to FIG. 1B, in some implementations, the visual elements 50 are associated with respective characteristic values 60. For example, the first visual element 50a is associated with a first characteristic value 60a, the second visual element 50b is associated with a second characteristic value 60b, the third visual element 50c is associated with a third characteristic value 60c, and the fourth visual element 50d is associated with a fourth characteristic value 60d.

As shown in FIG. 1B, in some implementations, the electronic device 20 determines an expected gaze target 70 based on the characteristic values 60. In the example of FIG. 1B, the expected gaze target 70 indicates an expected gaze position 72 that corresponds to the third visual element 50c. The expected gaze target 70 indicates a display region that the user 22 is expected to gaze at. In the example of FIG. 1B, the user 22 is expected to gaze at the third visual element 50c because the expected gaze position 72 coincides with a location of the third visual element 50c.

In some implementations, the characteristic values 60 include respective saliency values for the corresponding visual elements 50, and the electronic device 20 determines the expected gaze target 70 based on the saliency values. For example, the electronic device 20 selects the location of the third visual element 50c as the expected gaze position 72 because the third visual element 50c has the greatest saliency value among the visual elements 50. In some implementations, the electronic device 20 obtains (e.g., generates or receives) a saliency map for the graphical environment 40, and the electronic device 20 retrieves the saliency values for the visual elements 50 from the saliency map.

In some implementations, the characteristic values 60 include respective position values for the corresponding visual elements 50, and the electronic device 20 determines the expected gaze target 70 based on the position values. For example, the electronic device 20 may select a location of a particular visual element 50 as the expected gaze position 72 because the particular visual element 50 has a position value that is within a threshold range of position values where the user 22 is expected to look at (e.g., the particular visual element 50 is positioned near a center of a display area of the electronic device 20).

In some implementations, the characteristic values 60 include respective color values for the corresponding visual elements 50, and the electronic device 20 determines the expected gaze target 70 based on the color values. For example, the electronic device 20 may select a location of a particular visual element 50 as the expected gaze position 72 because the particular visual element 50 has a color value that matches a threshold color value that is expected to attract a gaze of the user 22 (e.g., the particular visual element 50 is red while the remainder of the display area of the electronic device 20 is black, or the particular visual element 50 is displayed in color while the remainder of the display area is displayed in black-and-white).

In some implementations, the characteristic values 60 include respective movement values for the corresponding visual elements 50, and the electronic device 20 determines the expected gaze target 70 based on the movement values. For example, the electronic device 20 may select a location of a particular visual element 50 as the expected gaze position 72 because the particular visual element 50 has a movement value that matches a threshold movement value that is expected to attract a gaze of the user 22 (e.g., the particular visual element 50 is moving while other visual elements 50 are stationary).

In some implementations, the characteristic values 60 include respective user interaction values for the corresponding visual elements 50, and the electronic device 20 determines the expected gaze target 70 based on the user interaction values. In some implementations, the user interaction values indicate respective levels of interactions with the visual elements 50 based on current and/or historical user inputs provided by the user 22. As an example, the electronic device 20 may select a location of a particular visual element 50 as the expected gaze position 72 because the particular visual element 50 has a user interaction value that matches a threshold interaction value and the user 22 is more likely to interact (e.g., select) that particular visual element 50 (e.g., the user 22 is more likely to select that particular visual element 50 because that particular visual element 50 has been selected most often among the visual elements 50).

In some implementations, the expected gaze target 70 is associated with a confidence value that indicates a degree of confidence (e.g., a degree of certainty) associated with the expected gaze target 70. In some implementations, the confidence value is based on a function of the characteristic values 60. In some implementations, the confidence value is a function of (e.g., proportional to) a variance in the characteristic values 60. As an example, if the third characteristic value 60c is the highest among the characteristic values 60 and a difference between the third characteristic value 60c and a second highest of the characteristic values 60 is greater than a threshold difference, then the confidence value associated with the expected gaze target 70 may be set to a value that is greater than a threshold confidence value (e.g., the confidence value may be set to a value that is greater than 0.5, for example, the confidence value may be set to '1'). In this example, if the difference between the highest and the second highest of the characteristic values 60 is less than the threshold difference, then the confidence value associated with the expected gaze target 70 may be set to a value that is less than the threshold confidence value (e.g., the confidence value may be set to a value that is less than 0.5, for example, the confidence value may be set to 0.2).

In some implementations, the expected gaze position 72 corresponds to a position indicated by a user input received via a physical input device. In some implementations, the electronic device 20 detects a user input at a particular position within the graphical environment 40 via a physical input device and the electronic device 20 sets the particular position of the user input as the expected gaze position 72. In some implementations, the electronic device 20 sets a cursor position of a cursor as the expected gaze position 72 in response to detecting a mouse click via a mouse. For example, the electronic device 20 may set a position (e.g., a center) of the third visual element 50c as the expected gaze position 72 in response to detecting a mouse click while the cursor is positioned on top of the third visual element 50c. In some implementations, the electronic device 20 sets the cursor position of the cursor as the expected gaze position 72 in response to detecting a tap or a press via a touch-sensitive surface such as a touchpad or a touchscreen display. For example, the electronic device 20 may set the position (e.g., the center) of the third visual element 50c as the expected gaze position 72 in response to detecting a tap or a press via the touchpad or the touchscreen display.

In some implementations, the electronic device 20 sets a position of a focus element as the expected gaze position 72 in response to detecting a key press via a keyboard. For example, the electronic device 20 may set the position (e.g., the center) of the third visual element 50c as the expected gaze position 72 in response to detecting the press of an enter key while the focus element is on the third visual element 50c. In some implementations, the electronic device 20 sets the position of the focus element as the expected gaze position 72 in response to detecting a voice input that corresponds to a selection command. For example, the electronic device 20 may set the position of the third visual element 50c as the expected gaze position 72 in response to detecting a select voice command while the focus element is on the third visual element 50c (e.g., when the user 22 says "select").

Figure 1C:
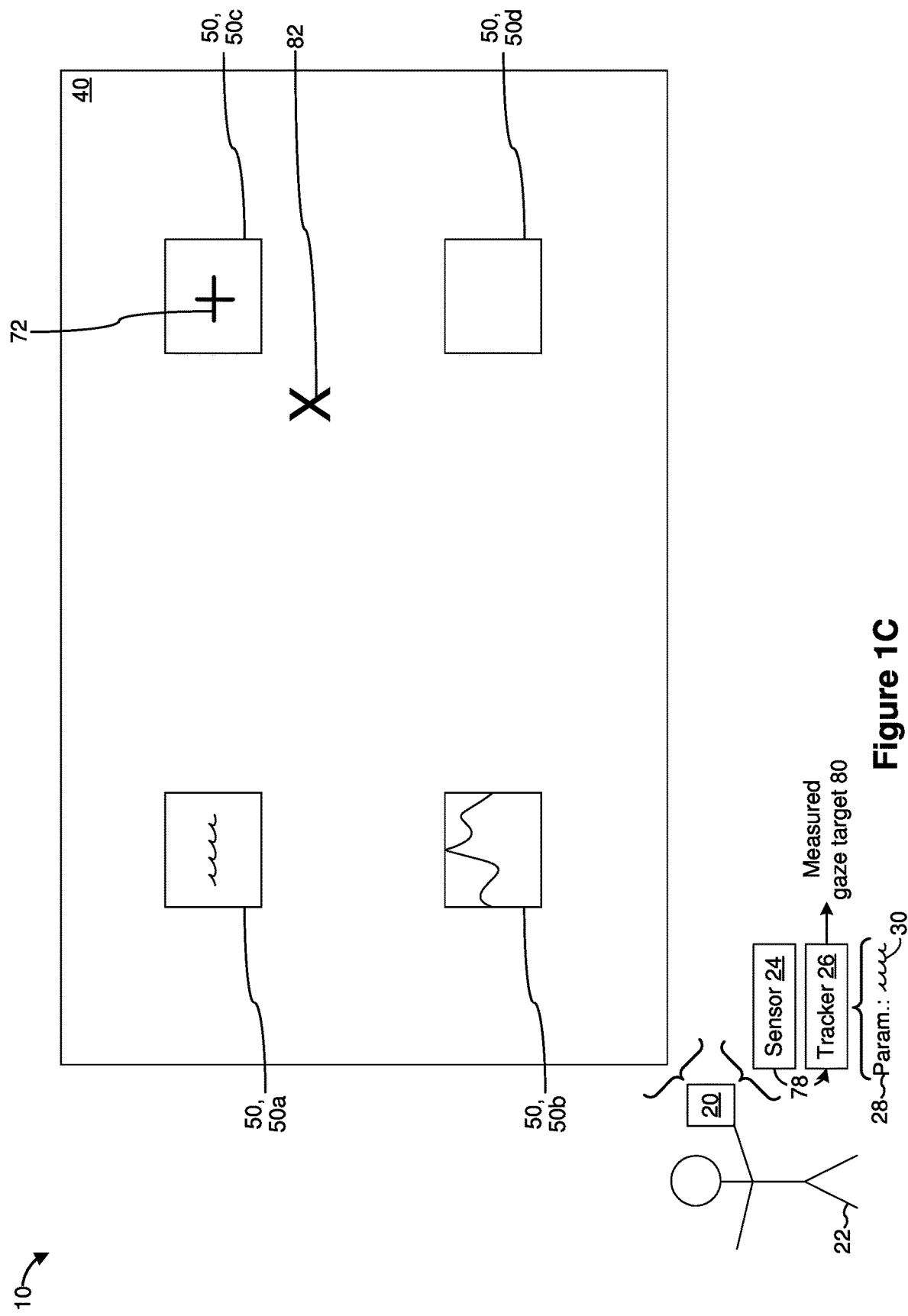

Referring to FIG. 1C, the image sensor 24 captures an image 78 of the user 22, and the gaze tracker 26 utilizes the image 78 to generate a measured gaze target 80. In some implementations, the measured gaze target 80 indicates a measured gaze position 82. The measured gaze position 82 represents a display region that the gaze tracker 26 has identified as corresponding to a gaze of the user 22. In some implementations, the measured gaze target 80 includes a measured gaze intensity that indicates a number of pixels that the gaze tracker 26 has identified as corresponding to the gaze of the user 22. In some implementations, the measured gaze target 80 includes a measured gaze duration that indicates a time duration that the gaze tracker 26 has identified as corresponding to the gaze of the user 22. As can be seen in FIG. 1C, the measured gaze position 82 can be different from the expected gaze position 72.

Referring back to FIG. 1B, in some implementations, the electronic device 20 selects a location of a particular visual element 50 as the expected gaze position 72 when the particular visual element 50 has a position value that is within a threshold range of position values from a position indicated by the measured gaze target 80. In some implementations, the electronic device 20 selects a location of a particular visual element 50 as the expected gaze position 72 when the visual element 50 has a position value that is closest to the position indicated by the measured gaze target 80. In some implementations, the electronic device 20 selects a location of a particular visual element 50 as the expected gaze position 72 when the visual element 50 has a position value that is closest to the position indicated by the measured gaze target 80 when the measured gaze position 82 remains stationary (or below a threshold amount of movement) for a threshold length of time. In some implementations, the electronic device 20 selects a location of a particular visual element 50 as the expected gaze position 72 when the visual element 50 has a position value that is closest to the position indicated by the measured gaze target 80 when a selection input is received.

Figure 1D:
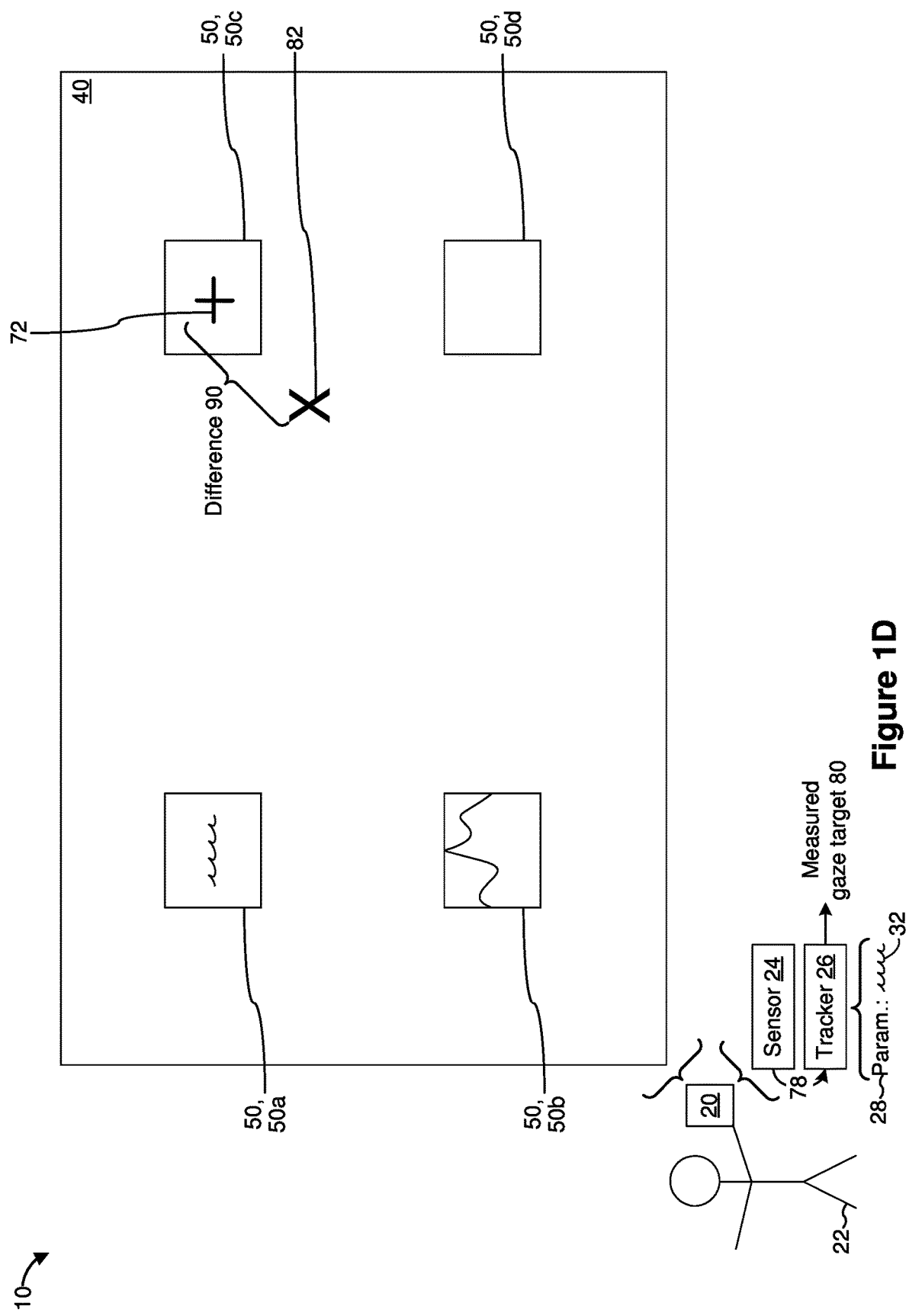

Referring to FIG. 1D, in various implementations, the electronic device 20 determines a difference between the expected gaze target 70 (shown in FIG. 1B) and measured gaze target 80 shown in FIGS. 1C and 1D. In the example of FIG. 1D, the electronic device 20 identifies a difference 90 between the expected gaze position 72 and the measured gaze position 82. The difference 90 may have been caused due to movement of the electronic device 20 relative to the eye of the user 22. For example, the difference 90 may have been caused because the eye is no longer at a center of a field-of-view of the image sensor 24. After identifying the difference 90, the electronic device 20 determines a new value 32 (e.g., a second value that is different from the first value 30 shown in FIG. 1C) for the calibration parameter 28. In some implementations, the new value 32 is a function of the difference 90. The new value 32 can compensate for the eye not being at the center of the field-of-view of the image sensor 24. The electronic device 20 replaces the first value 30 with the new value 32.

Figure 1E:
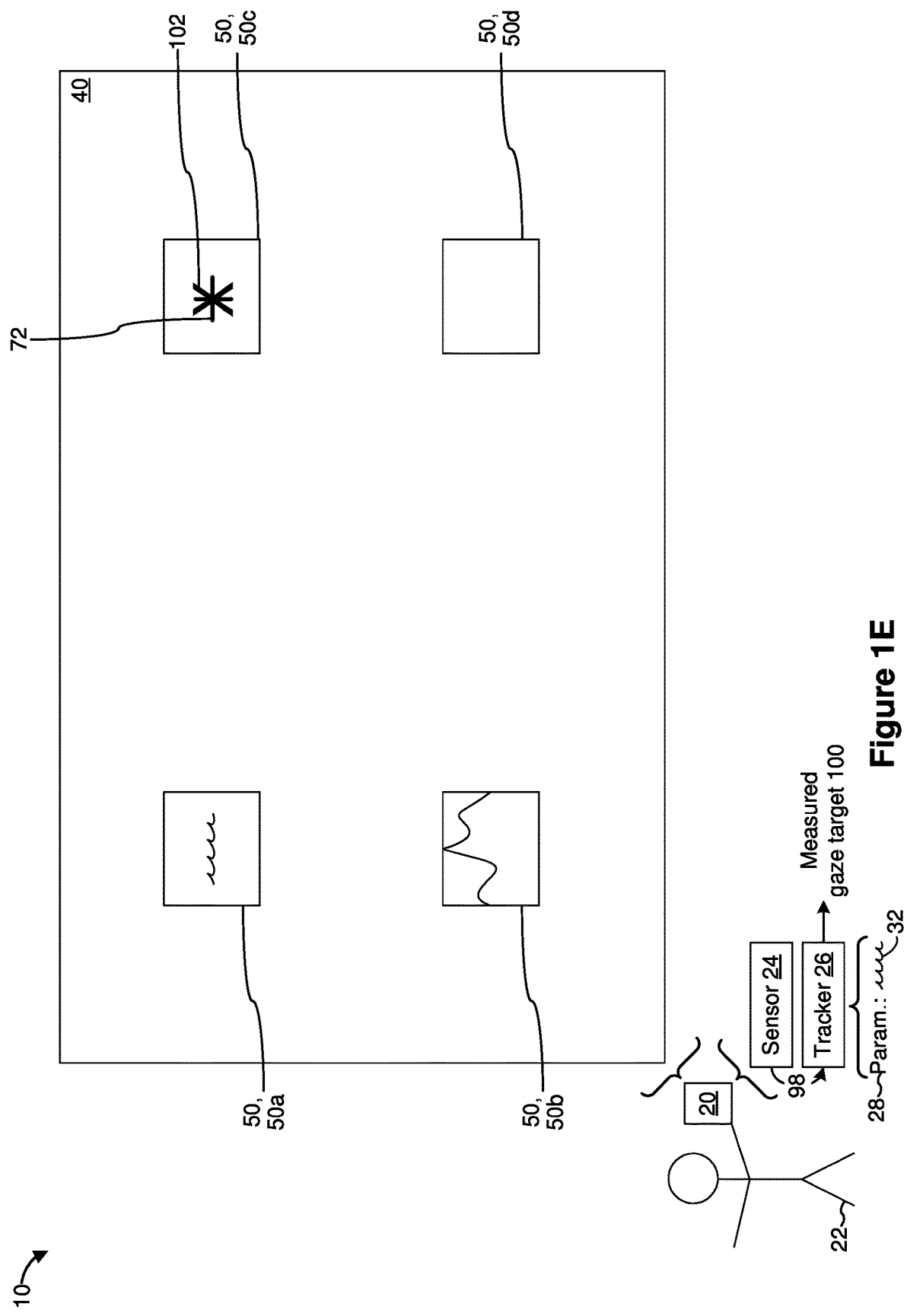

FIG. 1E corresponds to a time period that occurs after the electronic device 20 sets the calibration parameter 28 to the new value 32. After setting the calibration parameter 28 to the new value 32, the image sensor 24 captures another image 98 and the gaze tracker 26 generates another measured gaze target 100 based on the other image 98. The measured gaze target 100 indicates another measured gaze position 102 that coincides with the expected gaze position 72. Setting the calibration parameter 28 to the new value 32 reduces (e.g., makes smaller or eliminates) the difference 90 shown in FIG. 1D and improves an accuracy of the gaze tracker 26. As illustrated in FIGS. 1C-1E, the electronic device 20 adjusts the calibration parameter 28 while the electronic device 20 is performing non-calibration related operations. In the example of FIGS. 1C-1E, the adjustment to the calibration parameter 28 is performed as a background operation instead of a foreground operation in order to reduce disruption to the operability of the electronic device 20.

Advantageously, the electronic device 20 adjusts the calibration parameter 28 without displaying a prompt that requests the user 22 to adjust a position of the electronic device 20 on his/her head. For example, the electronic device 20 does not request the user 22 to move the electronic device 20 so that the eye of the user 22 is in the center of the field-of-view of the image sensor 24. Moreover, the electronic device 20 adjusts the calibration parameter 28 without performing a guided calibration that may include prompting the user 22 to look at a particular visual element 50 in order to adjust the calibration parameter 28. Foregoing presentation of a guided calibration reduces disruption to the operability of the electronic device 20 thereby increasing an availability of the electronic device.

Figure 1F:
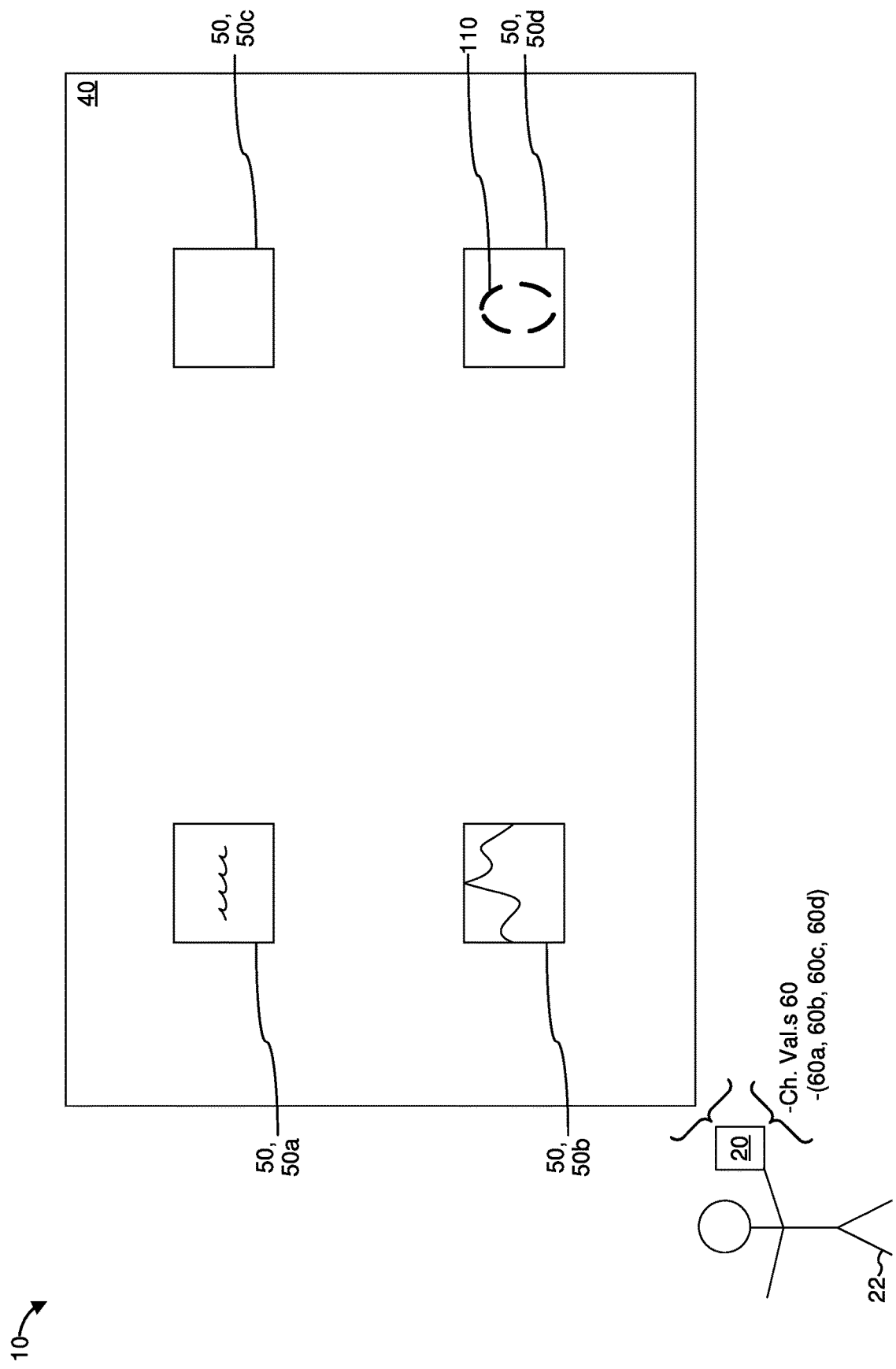
Figure 1G:
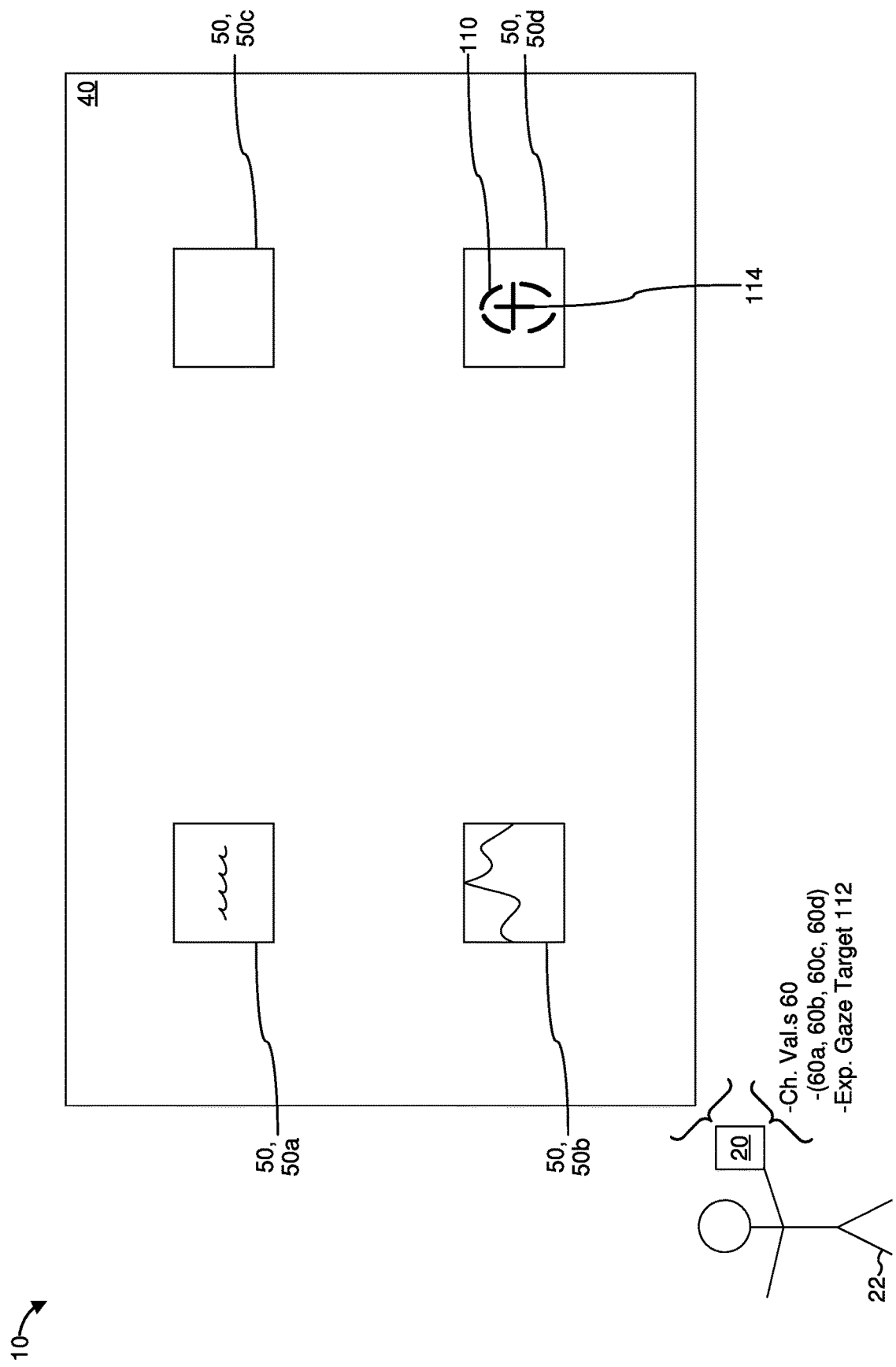

FIGS. 1F and 1G illustrate a sequence in which electronic device 20 determines an expected gaze target 112 (shown in FIG. 1G) based on a user input 110 provided by the user 22. As shown in FIG. 1F, the electronic device 20 detects the user input 110 at a location corresponding to the fourth visual element 50*d*. In some implementations, the electronic device 20 includes a touchscreen display and the electronic device 20 detects the user input 110 by detecting a tap on the touchscreen display. Alternatively, in some implementations, the electronic device 20 displays the graphical environment 40 as a virtual plane and the electronic device 20 detects the user input 110 by detecting an intersection between a collider object that represents a digit (e.g., a finger) of the user 22 and the virtual plane of the graphical environment 40. For example, the electronic device 20 detects the user input 110 by detecting a 3D gesture performed by the user 22. In some implementations, the electronic device 20 detects the user input 110 by detecting a voice input. For example, the user 22 may speak a phrase that corresponds to a request to select the fourth visual element 50*d* (e.g., the user 22 may say "select bottom right option"). In some implementations, the electronic device 20 detects the user input 110 via a physical input device such as a mouse, a keyboard, a touch-sensitive surface such as a touchpad, or a clicker device. In some implementations, the physical input device is connected to the electronic device 20 via a wire. Alternatively, in some implementations, the physical input device provides an indication of the user input 110 to the electronic device 20 via wireless communications.

In some implementations, the characteristic values 60 indicate whether the corresponding visual elements 50 have been selected. For example, the characteristic values 60 may include binary values where a value of '0' indicates that the corresponding visual element 50 has not been selected and a value of '1' indicates that the corresponding visual element 50 has been selected. In the example of FIG. 1F, the fourth characteristic value 60*d* may have a binary value of '1' to indicate that the fourth visual element 50*d* has been selected while the first, second and third characteristic values 60*a*, 60*b* and 60*c* may have a binary value of '0' to indicate that the first, second and third visual elements 50*a*, 50*b* and 50*c* have not been selected.

Referring to FIG. 1G, in response to detecting the user input 110 selecting the fourth visual element 50*d*, the electronic device 20 generates the expected gaze target 112 that indicates an expected gaze position 114 that corresponds to the fourth visual element 50*d*. As can be seen in FIG. 1G, the expected gaze position 114 indicates that the user 22 is expected to gaze at the fourth visual element 50*d* while the user 22 is selecting the fourth visual element 50*d*. In the example of FIG. 1G, if a difference between a measured gaze position and the expected gaze position 114 is greater than a threshold, the electronic device 20 adjusts the calibration parameter 28 of the gaze tracker 26 shown in FIG. 1A.

Figure 1H:
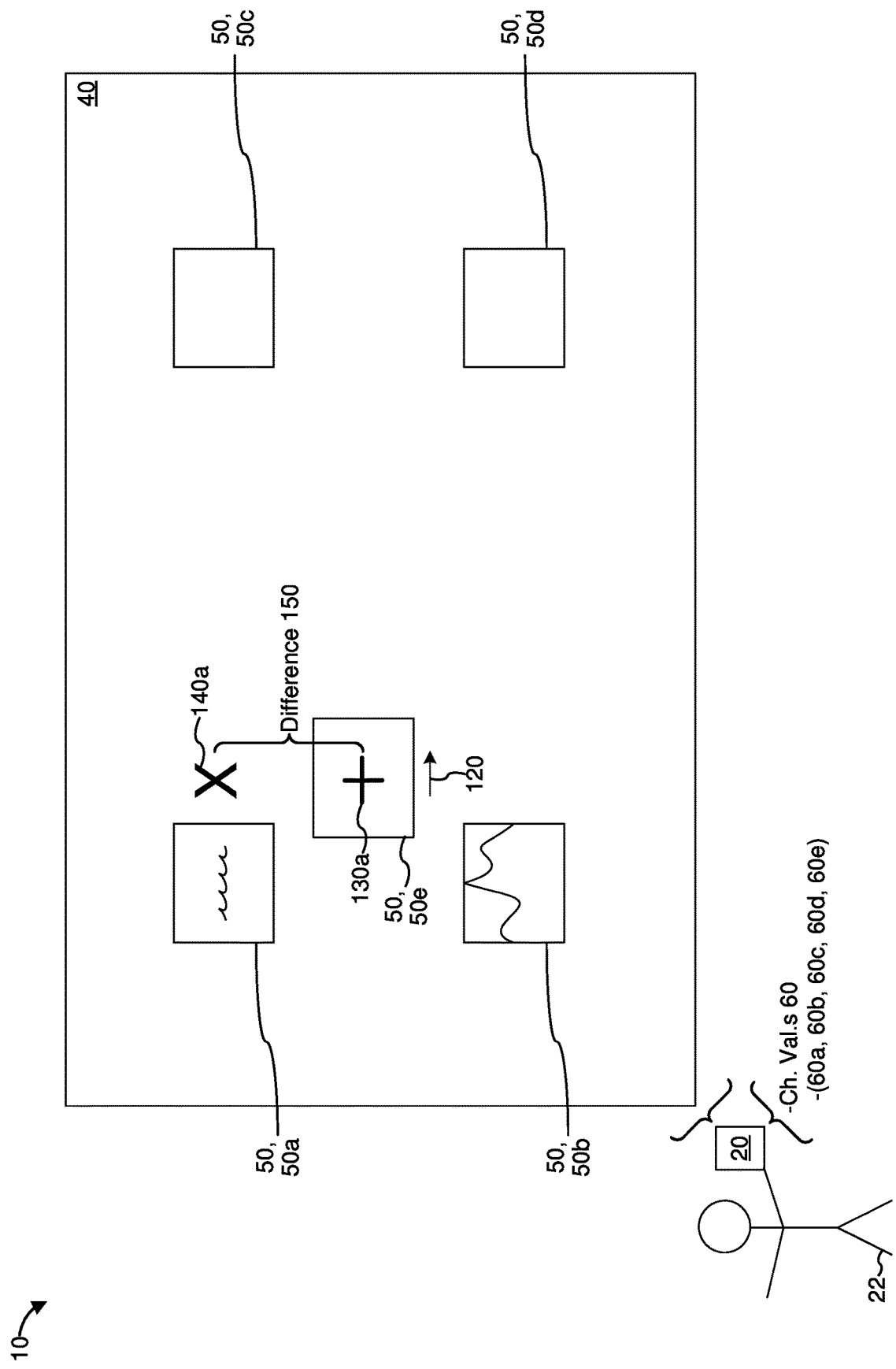
Figure 1I:
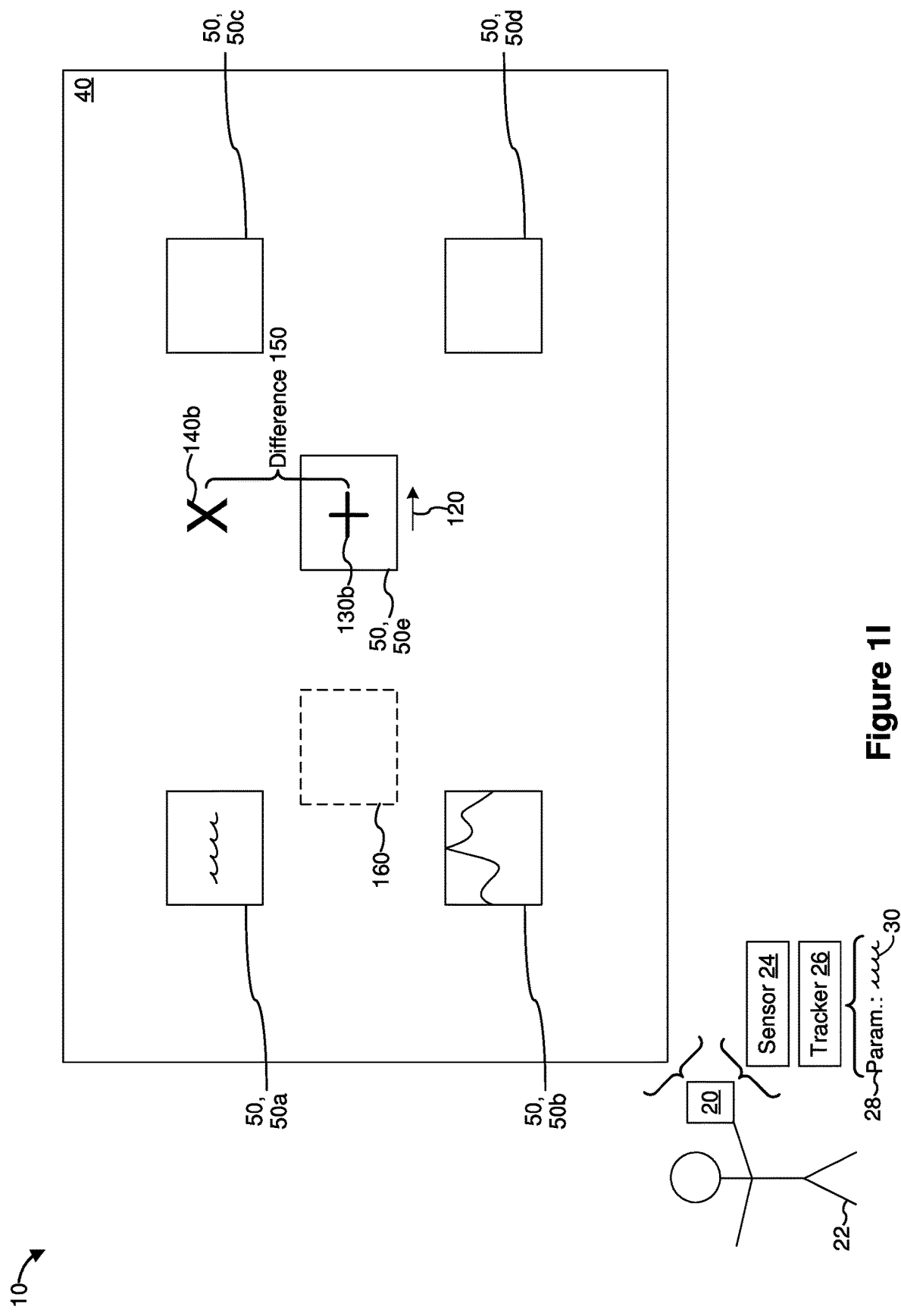
Figure 1J:
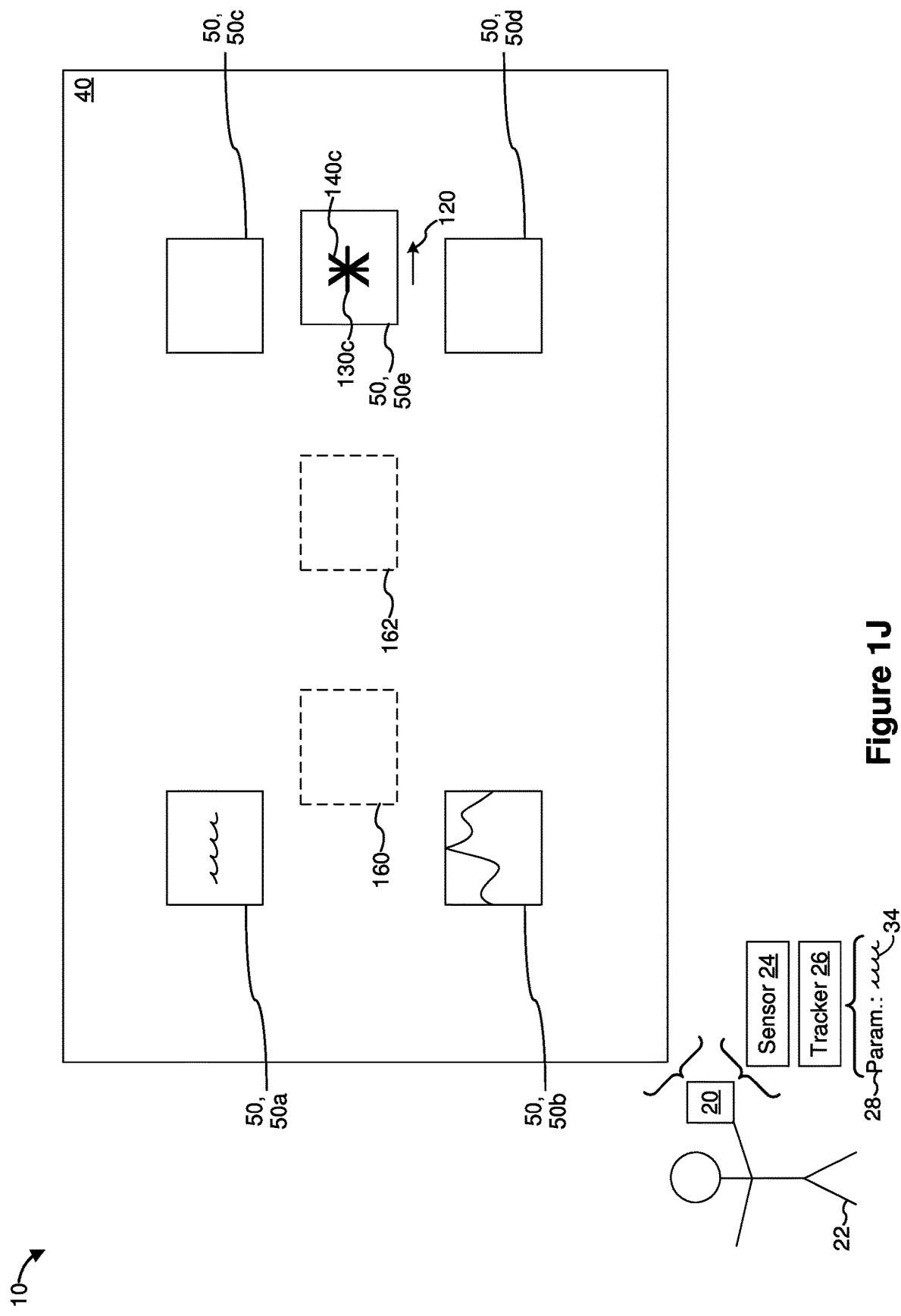

FIGS. 1H-1J illustrate a sequence in which the electronic device 20 determines an expected gaze target based on a movement of a particular visual element 50. FIG. 1H illustrates a fifth visual element 50*e* that is moving in a direction indicated by an arrow 120. For example, the fifth visual element 50*e* is moving towards a right side of the graphical environment 40. In some implementations, the characteristic values 60 indicate movement of the corresponding visual elements 50. For example, the characteristic values 60 may indicate respective speeds at which the corresponding visual elements 50 are moving. In the example of FIG. 1H, the visual elements 50*a*-50*d* are stationary. As such, the characteristic values 60*a*-60*d* may indicate a movement speed of zero. However, since the fifth visual element 50*e* is moving, a fifth characteristic value 60*e* may indicate a speed at which the fifth visual element 50*e* is moving. Alternatively, in some implementations, the characteristic values 60 include binary values where a value of '0' indicates no movement and a value of '1' indicates movement.

As shown in FIG. 1H, the electronic device 20 determines a first expected gaze position 130a that corresponds to a location of the fifth visual element 50e. In the example of FIG. 1H, the electronic device 20 selects the location of the fifth visual element 50e as the first expected gaze position 130a because the characteristic values 60 indicate that the fifth visual element 50e is moving while the remaining visual elements 50a-50d are stationary. As shown in FIG. 1H, the electronic device 20 determines a first measured gaze position 140a that is offset from the first expected gaze position 130a by a difference 150. The difference 150 between the first expected gaze position 130a and the first measured gaze position 140a may have been caused by a change in a position of an eye of the user 22 relative to the image sensor 24. For example, in some implementations, the electronic device 20 includes a head-mounted device that the user 22 wears on his/her head and the difference 150 may have been caused due to the electronic device 20 slipping on the head while the user 22 moves.

Referring to FIG. 1I, as the fifth visual element 50e moves across the graphical environment 40 in the direction indicated by the arrow 120, the electronic device 20 may generate additional expected gaze targets and additional measured gaze targets to determine whether or not to adjust the calibration parameter 28 of the gaze tracker 26. For example, the electronic device 20 determines a second expected gaze position 130b that corresponds to a new position of the fifth visual element 50e. In the example of FIG. 1I, a previous position of the fifth visual element 50e is indicated by a dashed box 160. The electronic device 20 determines a second measured gaze position 140b that is offset from the second expected gaze position 130b by the difference 150. Since the first measured gaze position 140a (shown in FIG. 1H) was offset from the first expected gaze position 130a (shown in FIG. 1H) by the difference 150 and the second measured gaze position 140b is offset from the second expected gaze position 130b by a similar or the same difference 150, the electronic device 20 determines to change the calibration parameter 28 of the gaze tracker 26 with a greater degree of certainty.

As shown in FIG. 1J, the electronic device 20 adjusts the calibration parameter 28 by changing a value of the calibration parameter 28 from the first value 30 to a third value 34. In some implementations, the third value 34 is a function of the difference 150 between the expected gaze positions 130a and 130b, and the corresponding measured gaze positions 140a and 140b. For example, in some implementations, a difference between the first value 30 and the third value 34 is proportional to the difference 150 shown in FIGS. 1H and 1I.

FIG. 1J illustrates a new position of the fifth visual element 50e, a third expected gaze position 130c and a third measured gaze position 140c. In the example of FIG. 1J, a previous position of the fifth visual element 50e is indicated by another dashed box 162. The electronic device 20 determines the third measured gaze position 140c after adjusting the calibration parameter 28. As can be seen in FIG. 1J, the third expected gaze position 130c and the third measured gaze position 140c are collocated. In other words, the third measured gaze position 140c matches the third expected gaze position 130c. Since the gaze tracker 26 determines the third measured gaze position 140c after setting the calibration parameter 28 to the third value 34, the third measured gaze position 140c coincides with the third expected gaze position 130c. As such, the third measured gaze position 140c is not offset from the third expected gaze position 130c.

Figure 2:
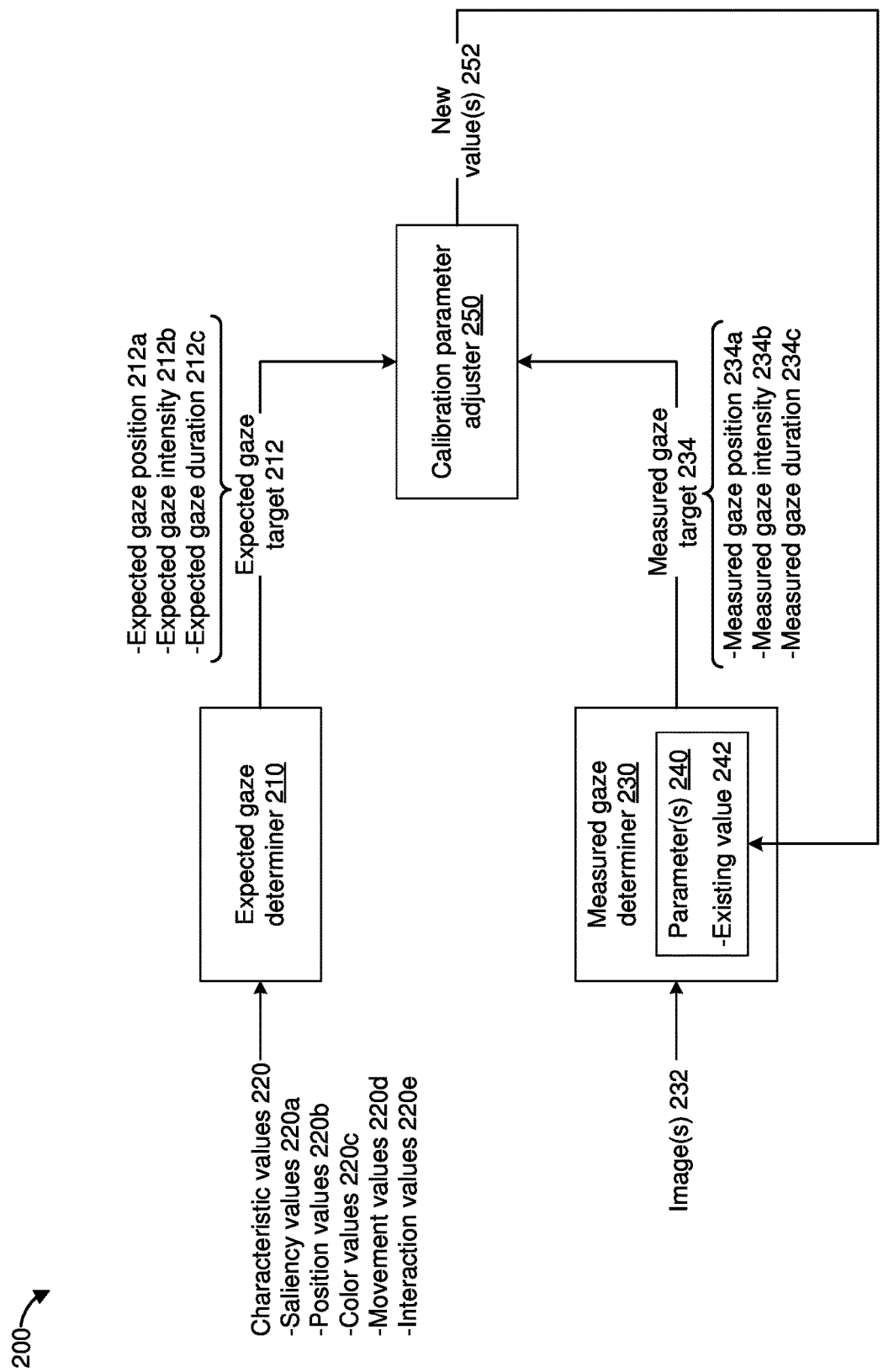
FIG. 2 is a block diagram of a system that adjusts a calibration parameter of a gaze tracker in accordance with some implementations.

FIG. 2 is a block diagram of a system 200 that adjusts a calibration parameter of a gaze tracker (e.g., the calibration parameter 28 of the gaze tracker 26 shown in FIG. 1A) in accordance with some implementations. In some implementations, the system 200 includes an expected gaze determiner 210, a measured gaze determiner 230 and a calibration parameter adjuster 250. In various implementations, the system 200 resides at (e.g., is implemented by) the electronic device 20 shown in FIGS. 1A-1J.

In various implementations, the expected gaze determiner 210 obtains (e.g., receives or determines) characteristic values 220 that are associated with corresponding visual elements being displayed on a display (e.g., the characteristic values 60 shown in FIG. 1B). As shown in FIG. 2, the expected gaze determiner 210 determines an expected gaze target 212 based on the characteristic values 220. For example, the expected gaze determiner 210 determines the expected gaze target 70 shown in FIG. 1B. In some implementations, the expected gaze target 212 includes an expected gaze position 212a (e.g., the expected gaze position 72 shown in FIG. 1B), an expected gaze intensity 212b and/or an expected gaze duration 212c. In some implementations, the expected gaze determiner 210 determines the expected gaze target 212 such that the expected gaze position 212a corresponds to a visual element with the greatest characteristic value 220.

In some implementations, the expected gaze determiner 210 determines a confidence score that is associated with the expected gaze target 212. The confidence score indicates a degree of certainty in the expected gaze target 212. In some implementations, the confidence score is a function of the characteristic values 220. For example, the confidence score may be based on a distribution of the characteristic values 220. As an example, if the characteristic values 220 have a relatively large variance, the confidence score may be relatively high. By contrast, if the characteristic values 220 have a relatively low variance, the confidence score may be relatively low.

In some implementations, the characteristic values 220 include saliency values 220a that indicate respective saliency levels of the visual elements. In some implementations, the saliency values 220a are based on respective prominence of the visual elements (e.g., more prominent visual elements have a greater saliency value 220a than less prominent visual elements). In some implementations, the saliency values 220a are based on respective noticeability of the visual elements (e.g., more noticeable visual elements have a greater saliency value 220a than less noticeable visual elements). In some implementations, the expected gaze determiner 210 obtains (e.g., receives or generates) a saliency map that includes the saliency values 220a. In some implementations, the expected gaze determiner 210 determines the expected gaze target 212 such that the expected gaze position 212a corresponds to a visual element with the greatest saliency value 220a.

In some implementations, the characteristic values 220 include position values 220b that indicate respective positions of the visual elements. In some implementations, the user is more likely to gaze at a particular position. For example, the user may be more likely to gaze at a visual element that is positioned towards a center of the display area. In this example, the expected gaze determiner 210 may generate the expected gaze target 212 such that the expected gaze position 212a points to a visual element that is near the center of the display area. More generally, in various implementations, the expected gaze determiner 210 generates the expected gaze target 212 such that the expected gaze position 212a corresponds to a visual element that is positioned within a portion of the display area that the user is more likely to gaze at. In some implementations, the expected gaze determiner 210 identifies the portion of the display area that the user is more likely to gaze at based on historical gaze tracking data. For example, if historical gazing tracking data indicates that the user spends more time gazing at a particular portion of the display area (e.g., the center or the top right), then the expected gaze determiner 210 determines that the particular portion of the display area is what the user is more likely to gaze at.

In some implementations, the characteristic values 220 include color values 220c that indicate respective colors of the visual elements. In some implementations, the user is more likely to gaze at colorful visual elements and less likely to gaze at black-and-white visual elements. More generally, in various implementations, the user is more likely to gaze at some colors (e.g., bright colors such as red and blue) and less likely to gaze at other colors (e.g., dull colors such as gray). In some implementations, the expected gaze determiner 210 generates the expected gaze target 212 such that the expected gaze position 212a points to a position of a visual element with a color value 220c that matches a threshold color value (e.g., a preferential color, for example, a bright color such as red or blue).

In some implementations, the characteristic values 220 include movement values 220d that indicate respective movements of the visual elements. In some implementations, the movement values 220d include binary values that indicate whether or not the corresponding visual elements are moving (e.g., a '0' for stationary and a '1' for moving). In some implementations, the expected gaze determiner 210 determines that the user is more likely to gaze at a moving visual element and less likely to gaze at a stationary visual element. As such, in some implementations, the expected gaze determiner 210 generates the expected gaze target 212 such that the expected gaze position 212a points to a visual element with a movement value 220d indicative of movement (e.g., with a movement value 220d of '1'). In some implementations, the movement values 220d include movement speeds. In some implementations, the expected gaze determiner 210 determines that the user is more likely to gaze at a visual element that is moving fast and less likely to gaze at a visual element that is moving slow. As such, in some implementations, the expected gaze determiner 210 generates the expected gaze target 212 such that the expected gaze position 212a points to a visual element with the greatest movement value 220d.

In some implementations, the characteristic values 220 include interaction values 220e that indicate current and/or historical user interactions with the visual elements. In some implementations, the interaction values 220e include binary values that indicate whether or not the user is currently interacting with the corresponding visual elements. For example, an interaction value 220e of '1' may indicate that the device has detected a user input selecting the corresponding visual element and an interaction value 220e of '0' may indicate that the device has not detected a user input selecting the corresponding visual element. In some implementations, the expected gaze determiner 210 determines that the user is more likely to gaze at a visual element that the user is currently interacting with and less likely to gaze at a visual element that the user is not currently interacting with. As such, in some implementations, the expected gaze determiner 210 generates the expected gaze target 212 such that the expected gaze position 212a points to a visual element that the user has selected via a user input (e.g., a click input via a mouse, a key press input via a keyboard, a touch input via a touchpad or a touchscreen, a gesture input via a touchscreen or a 3D gesture tracker, a voice input via a microphone, etc.). As an example, referring to FIG. 1G, the expected gaze determiner 210 generates the expected gaze position 114 pointing to the fourth visual element 50d in response to the user input 110 selecting the fourth visual element 50d.

In some implementations, the interaction values 220e indicate historical user interactions with the corresponding visual elements. In some implementations, historical user interactions include historical user inputs directed to the visual elements. In some implementations, the expected gaze determiner 210 determines that a visual element with more historical user interactions is more likely to be gazed at than a visual element with fewer historical user interactions. As such, in some implementations, the expected gaze determiner 210 generates the expected gaze target 212 such that the expected gaze position 212a coincides with a position of a visual element with the greatest interaction value 220e.

In various implementations, the measured gaze determiner 230 obtains a set of one or more images 232 of an eye of the user, and the measured gaze determiner 230 determines a measured gaze target 234 based on the image(s) 232. In some implementations, the measured gaze determiner 230 receives the image(s) 232 from an image sensor (e.g., a user-facing camera, for example, an eye tracking camera) that captures the image(s) 232. In some implementations, the measured gaze determiner 230 implements the gaze tracker 26 shown in FIG. 1A. In some implementations, the measured gaze determiner 230 includes a set of one or more calibration parameters 240 (e.g., the calibration parameter 28 shown in FIG. 1A). In the example of FIG. 2, the set of one or more calibration parameters 240 have existing values 242. For example, as shown in FIG. 1A, the calibration parameter 28 has a first value 30.

In various implementations, the measured gaze determiner 230 determines a measured gaze target 234 based on the image(s) 232 of the eye of the user. In some implementations, measured gaze target 234 includes a measured gaze position 234a (e.g., the measured gaze position 82 shown in FIG. 1C), a measured gaze intensity 234b and/or a measured gaze duration 234c. In some implementations, the measured gaze target 234 is a function of the existing values 242 of the calibration parameters 240. As such, changing the values of the calibration parameters 240 triggers a change in the measured gaze target 234. In some implementations, the measured gaze determiner 230 provides the measured gaze target 234 to the calibration parameter adjuster 250.

In some implementations, the expected gaze determiner 210 generates the expected gaze target 212 such that the expected gaze position 212a points to a visual element that is close to or nearest to a position indicated by the measured gaze target 234. In some implementations, the expected gaze determiner 210 generates the expected gaze target 212 such that the expected gaze position 212a points to a visual element that is close to or nearest to a position indicated by the measured gaze target 234 when the measured gaze target 234 remains stationary (or below a threshold amount of movement) for a threshold length of time. In some implementations, the expected gaze determiner 210 generates the expected gaze target 212 such that the expected gaze position 212a points to a visual element that is close to or nearest to a position indicated by the measured gaze target 234 when a selection input is received (e.g., a touch input, a gesture input, a voice input, etc.).

In some implementations, the calibration parameter adjuster 250 adjusts the calibration parameters 240 based on a comparison of the expected gaze target 212 and the measured gaze target 234. In some implementations, the calibration parameter adjuster 250 generates new values 252 for the calibration parameters 240 when a difference between the expected gaze target 212 and the measured gaze target 234 exceeds a threshold difference. Referring to FIG. 1D, the calibration parameter adjuster 250 changes the value of the calibration parameter 28 from the first value 30 to the new value 32 based on the difference 90 between the expected gaze position 72 and the measured gaze position 82. In some implementations, the calibration parameter adjuster 250 generates the new values 252 for the calibration parameters 240 in order to reduce a difference between a subsequent expected gaze target and a corresponding subsequent measured gaze target. In some implementations, the calibration parameter adjuster 250 generates the new values 252 as a background operation while the device continues to perform other operations (e.g., non-calibration related operations such as displaying visual content).

In some implementations, the new values 252 are a function of the difference between the expected gaze target 212 and the measured gaze target 234. In some implementations, a difference between the existing values 242 and the new values 252 is proportional to the difference between the expected gaze target 212 and the measured gaze target 234. For example, the greater the difference between the expected gaze target 212 and the measured gaze target 234, the greater the difference between the existing values 242 and the new values 252. In some implementations, the calibration parameter adjuster 250 uses a lookup table (LUT) to determine the new values 252. For example, the LUT may list various values representing varying differences in the expected gaze target 212 and the measured gaze target 234, and corresponding changes to be made to the existing values 242.

In some implementations, the calibration parameter adjuster 250 obtains a confidence score associated with the expected gaze target 212. For example, the expected gaze determiner 210 provides the expected gaze target 212 and the confidence score associated with the expected gaze target 212 to the calibration parameter adjuster 250. In some implementations, the calibration parameter adjuster 250 generates the new values 252 for the calibration parameters 240 in response to the confidence score being greater than a threshold confidence score. In some implementations, the calibration parameter adjuster 250 forgoes generating the new values 252 for the calibration parameters 240 in response to the confidence score being less than the threshold confidence score.

Figure 3:
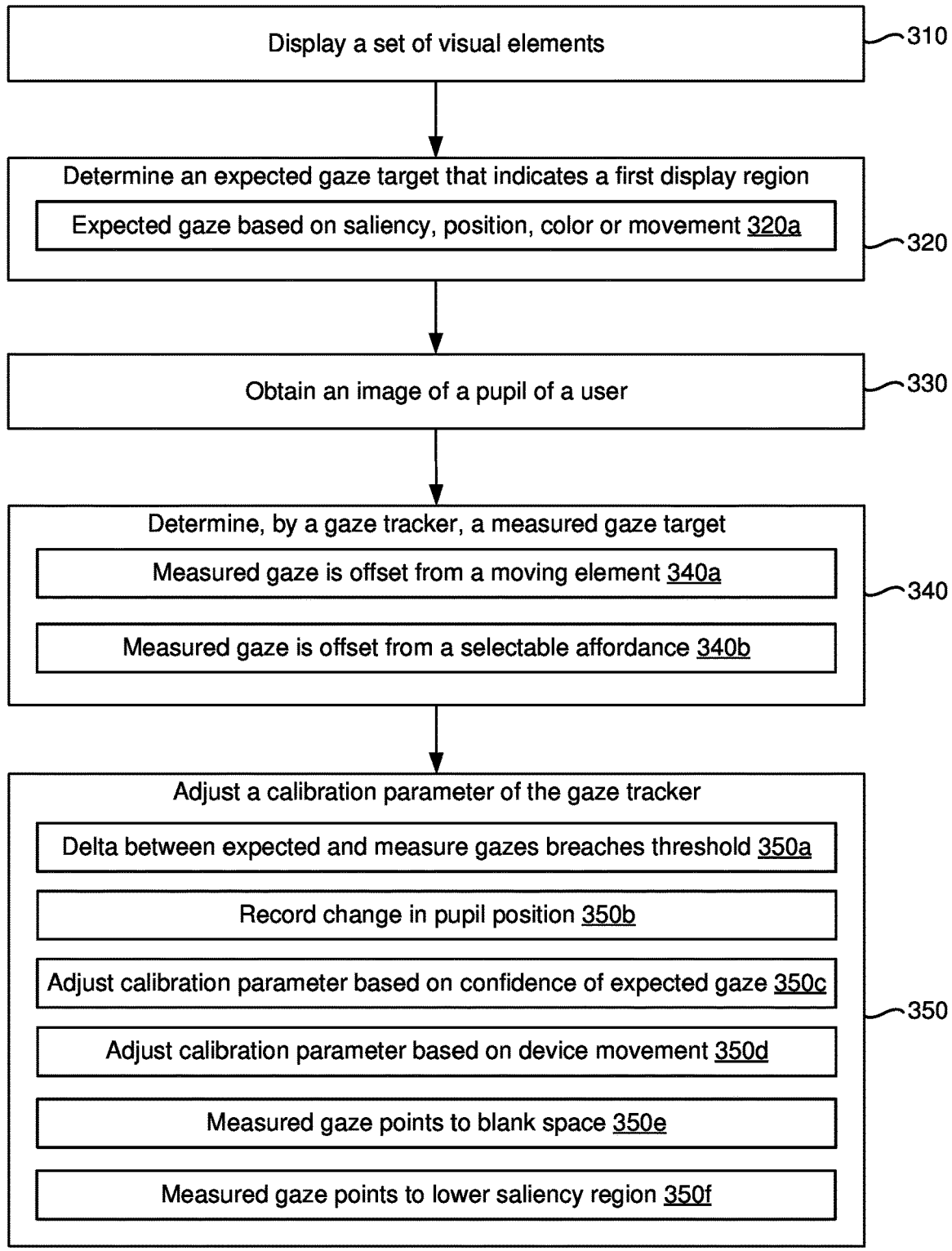
FIG. 3 is a flowchart representation of a method of adjusting a calibration parameter of a gaze tracker in accordance with some implementations.

FIG. 3 is a flowchart representation of a method 300 for adjusting a calibration parameter of a gaze tracker. In various implementations, the method 300 is performed by a device including a display, an image sensor, a non-transitory memory and one or more processors coupled with the display, the image sensor and the non-transitory memory (e.g., the electronic device 20 shown in FIGS. 1A-1J and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes displaying, on the display, a plurality of visual elements. For example, as shown in FIG. 1A, the electronic device 20 displays the visual elements 50. In some implementations, the visual elements include text (e.g., the text 52 shown in FIG. 1A) and/or an image (e.g., the graphic 54 shown in FIG. 1A). In some implementations, the visual elements include GUI elements that are a part of a GUI. For example, the visual elements include selectable affordances (e.g., buttons) that can be selected by a user of the device.

As represented by block 320, in various implementations, the method 300 includes determining, based on respective characteristic values of the plurality of visual elements, an expected gaze target that indicates a first display region where a user of the device is expected to gaze or intended to gaze while the plurality of visual elements is being displayed. For example, as shown in FIG. 1B, the electronic device 20 determines the expected gaze target 70 based on the characteristic values 60 of the visual elements 50.

As represented by block 320a, in some implementations, the respective characteristic values include respective saliency values. In such implementations, the method 300 includes determining the expected gaze target based on the respective saliency values. For example, as shown in FIG. 2, in some implementations, the characteristic values 220 include the saliency values 220a, and the expected gaze determiner 210 determines the expected gaze target 212 based on the saliency values 220a. In some implementations, the user is expected to gaze at the most salient of the visual elements. As an example, if the device is displaying a virtual character, the user may be expected to gaze at the virtual character's eyes instead of the virtual character's knees. As such, in this example, the eyes of the virtual character may have a greater saliency value than the knees of the virtual character.

In some implementations, the respective characteristic values include position values that indicate respective placements of the plurality of visual elements. In such implementations, the method 300 includes determining the expected gaze target based on the position values of the visual elements. For example, as shown in FIG. 2, in some implementations, the characteristic values 220 include the position values 220b, and the expected gaze determiner 210 determines the expected gaze target 212 based on the position values 220b. As an example, the user may be expected to gaze at a visual element that is positioned near a center of a display area instead of a visual element that is positioned near an edge of the display area that may be in a peripheral vision of the user. In this example, the expected gaze target points to a visual element that is near the center of the display area. In other implementations, the user may be expected to gaze at a visual element to select the visual element or may be expected to gaze at a visual element while providing a separate selection input (e.g., a touch input, a gesture input, a voice input, etc.).

In some implementations, the respective characteristic values include color values that indicate respective colors of the plurality of visual elements. In such implementations, the method 300 includes determining the expected gaze target based on the color values of the visual elements. For example, as shown in FIG. 2, in some implementations, the characteristic values 220 include the color values 220c, and the expected gaze determiner 210 determines the expected gaze target 212 based on the color values 220c. As an example, the user may be expected to gaze at the most colorful visual element. As another example, the user may be expected to gaze at visual elements that have a particular color (e.g., red, blue, etc.).

In some implementations, the respective characteristic values include movement values that indicate respective speeds at which the plurality of visual elements are moving. In such implementations, the method 300 includes determining the expected gaze target based on the movement values of the visual elements. For example, as shown in FIG. 2, in some implementations, the characteristic values 220 include the movement values 220d, and the expected gaze determiner 210 determines the expected gaze target 212 based on the movement values 220d. As an example, the user may be expected to gaze at a moving visual element and not a stationary visual element. For example, referring to FIGS. 1H-1J, the user 22 is expected to gaze at the fifth visual element 50e that is moving and not the visual elements 50a-50d that are stationary.

In some implementations, the respective characteristic values include interaction values that indicate respective levels of interactions between the user and the plurality of visual elements. In such implementations, the method 300 includes determining the expected gaze target based on the interaction values associated with the visual elements. For example, as shown in FIG. 2, the characteristic values 220 include the interaction values 220e, and the expected gaze determiner 210 determines the expected gaze target 212 based on the interaction values 220e. As another example, referring to FIG. 1G, the user 22 is expected to gaze at the fourth visual element 50d when the user input 110 is directed to the fourth visual element 50d.

In some implementations, determining the expected gaze target includes detecting, via a physical input device, an input directed to the first display region, and setting the first display region as the expected gaze target in response to detecting the input directed to the first display region. For example, referring to FIGS. 1F and 1G, the electronic device 20 detects the user input 110 via a physical input device and sets a position indicated by the user input 110 as the expected gaze position 114.

In some implementations, determining the expected gaze target includes detecting, via a mouse, a mouse click while the first display region corresponds to a cursor position, and setting the cursor position as the expected gaze target in response to detecting the mouse click. For example, referring to FIGS. 1F and 1G, in some implementations, the electronic device 20 detects the user input 110 via a mouse. For example, the user 22 uses the mouse to move a cursor to the fourth visual element 50d, and clicks or double-clicks the fourth visual element 50d.

In some implementations, determining the expected gaze target includes detecting, via a touch-sensitive surface, a tap input while the first display region corresponds to a cursor position, and setting the cursor position as the expected gaze target in response to detecting the tap input. For example, referring to FIGS. 1F and 1G, in some implementations, the electronic device 20 detects the user input 110 via a touchpad. For example, the user 22 uses the touchpad to move a cursor to the fourth visual element 50d, and clicks or double-clicks the fourth visual element 50d.

In some implementations, determining the expected gaze target includes detecting, via a keyboard, a key press while the first display region corresponds to a focus indicator, and setting the first display region as the expected gaze target in response to detecting the key press. For example, referring to FIGS. 1F and 1G, in some implementations, the electronic device 20 detects the user input 110 via a keyboard. For example, the user 22 uses directional keys on the keyboard to move a focus indicator to the fourth visual element 50d, and presses an enter key to select the fourth visual element 50d.

In some implementations, determining the expected gaze target includes detecting, via an audio sensor, a voice input including a selection command while the first display region corresponds to a focus indicator, and setting the first display region as the expected gaze target in response to detecting the voice input including the selection command. For example, referring to FIGS. 1F and 1G, in some implementations, the electronic device 20 detects the user input 110 via a voice input received via a microphone. For example, if the fourth visual element 50d represents an icon for a messaging application, the user 22 may say "open messaging application".

As represented by clock 330, in various implementations, the method 300 includes obtaining, via the image sensor, an image that includes a set of pixels corresponding to a pupil of the user of the device. For example, as shown in FIG. 1C the image sensor 24 captures the image 78 of at least one eye of the user 22. In some implementations, the image sensor includes a user-facing camera that captures the image after obtaining informed consent from the user. In some implementations, the image sensor includes an eye tracking camera that captures the image after obtaining informed consent from the user.

As represented by block 340, in various implementations, the method 300 includes determining, by a gaze tracker, based on the set of pixels corresponding to the pupil, a measured gaze target that indicates a second display region where the user is measuredly gazing. For example, referring to FIG. 1C, the gaze tracker 26 determines the measured gaze target 80 that indicates the measured gaze position 82 where the user 22 of the electronic device 20 is currently gazing. As another example, referring to FIG. 2, the measured gaze determiner 230 determines the measured gaze target 234 based on the image(s) 232. In some implementations, the second display region indicated by the measured gaze target is at a distance from the first display region indicated by the expected gaze target. As an example, FIG. 1D illustrates the difference 90 between the expected gaze position 72 and the measured gaze position 82. As another example, the measured gaze target may indicate that the user is gazing at a blank space that is several pixels away from an expected gaze position that corresponds to eyes of a virtual character that is being displayed.

As represented by block 340a, in some implementations, the plurality of visual elements includes a moving element that the user is expected to gaze at, the expected gaze target corresponds to a position of the moving element, and the measured gaze target indicates a position that is offset from the position of the moving element. For example, as shown in FIG. 1H, the visual elements 50 include the fifth visual element 50e that is moving in the direction indicated by the arrow 120, the first expected gaze position 130a overlaps with a position of the fifth visual element 50e, and the first measured gaze position 140a is offset from the first expected gaze position 130a by the difference 150.

As represented by block 340b, in some implementations, the plurality of visual elements includes a selectable affordance that the user is expected to gaze at while selecting the selectable affordance, the expected gaze target corresponds to a position of the selectable affordance, and the measured gaze target indicates a position that is offset from the position of the selectable affordance. For example, as shown in FIG. 1G, the user 22 selects the fourth visual element 50d, the expected gaze position 114 overlaps with a position of the fourth visual element 50d and a measured gaze position (not shown in FIG. 1G) does not overlap with the fourth visual element 50d.

As represented by block 350, in various implementations, the method 300 includes adjusting a calibration parameter of the gaze tracker based on a difference between the first display region indicated by the expected gaze target and the second display region indicated by the measured gaze target. For example, as shown in FIGS. 1C-1E, the electronic device 20 adjusts the calibration parameter 28 by changing a value of the calibration parameter 28 from the first value 30 to the new value 32 based on the difference 90 between the expected gaze position 72 and the measured gaze position 82. In various implementations, the device adjusts the calibration parameter so that a subsequently captured image results in a measured gaze position that overlaps with the expected gaze position. For example, as shown in FIG. 1E, changing a value of the calibration parameter 28 from the first value 30 to the new value 32 causes the measured gaze position 102 to overlap with the expected gaze position 72. As described herein, in various implementations, the adjustment to the calibration parameter is performed as a background operation without prompting the user to look at certain visual elements as part of a guided calibration operation. Adjusting the calibration parameter as a background operation reduces disruption to the operability of the device thereby increasing a usability of the device.

As represented by block 350a, in some implementations, adjusting the calibration parameter includes adjusting the calibration parameter when a distance between the first display region and the second display region is greater than a threshold distance. For example, referring to FIGS. 1D-1E, the electronic device 20 adjusts the calibration parameter 28 in response to the difference 90 between the expected gaze position 72 and the measured gaze position 82 being greater than a threshold distance. In some implementations, the method 300 includes foregoing adjustment of the calibration parameter when the distance between the first display region and the second display region is less than the threshold distance.

In some implementations, the adjustment to the calibration parameter is proportional to a distance between the first display region and the second display region. For example, a greater distance between the first display region and the second display region results in a greater adjustment to the calibration parameter. As an example, referring to FIG. 1D, the adjustment to the calibration parameter 28 is proportional to the difference 90 between the expected gaze position 72 and the measured gaze position 82.

As represented by block 350b, in some implementations, adjusting the calibration parameter includes recording a change in a position of the pupil from a first expected position to a second expected position. In some implementations, the device includes a head-mountable device that the user is expected to wear in a particular manner. For example, an eye of the user is expected to be at a center of a field-of-view of an eye tracking camera. However, as the user moves the head-mountable device may slip and the eye may no longer be at the center of the field-of-view of the eye tracking camera. In some implementations, adjusting the calibration parameter compensates for the movement of the head-mountable device on the head of the user. For example, the change in the calibration parameter compensates for the eye not being at the center of the field-of-view of the eye tracking camera.

As represented by block 350c, in some implementations, the expected gaze target is associated with a confidence score, and adjusting the calibration parameter includes adjusting the calibration parameter in response to the confidence score being greater than a threshold confidence score and forgoing adjustment of the calibration parameter in response to the confidence score being less than the threshold confidence score. For example, as described in relation to FIG. 2, in some implementations, the calibration parameter adjuster 250 generates the new values 252 for the calibration parameters 240 when the expected gaze target 212 is associated with a confidence score that is greater than a threshold confidence score, and the calibration parameter adjuster 250 forgoes generation of the new values 252 when the expected gaze target 212 is associated with a confidence score that is less than the threshold confidence score.

In some implementations, the confidence score is a function of a density of the plurality of visual elements. For example, the confidence score may be a function of an amount of spacing between the plurality of visual elements. As an example, when the visual elements are positioned relatively close to each other, the confidence score for the expected gaze target may be relatively low (e.g., lower than a threshold confidence score). By contrast, when the visual elements are positioned relatively far from each other, the confidence score for the expected gaze target may be relatively high (e.g., greater than the threshold confidence score).

In some implementations, the confidence score is a function of a distance between the first display region and the second display region. For example, referring to FIG. 1D, the confidence score for the expected gaze target 70 may be a function of the difference 90 between the expected gaze position 72 and the measured gaze position 82. In some implementations, the confidence score is inversely proportional to the distance between the first display region and the second display region. For example, the greater the distance between an expected gaze position and a measured gaze position, the smaller the confidence score for the expected gaze position.

As represented by block 350d, in some implementations, adjusting the calibration parameter includes adjusting the calibration parameter in response to device movement data indicating that the device has moved more than a threshold amount since a previous adjustment to the calibration parameter. As described herein, a head-mountable device may slip on the user's head due to the user moving while using the device. In some implementations, if sensor data from a visual inertial odometry (VIO) system (e.g., accelerometer data from an accelerometer, gyroscope data from a gyroscope and/or magnetometer data from a magnetometer) indicates that the head-mountable device and/or the user has moved more than a threshold amount since the previous adjustment to the calibration parameter, the device can adjust the calibration parameter in order to continue providing accurate gaze tracking.

As represented by block 350e, in some implementations, adjusting the calibration parameter includes adjusting the calibration parameter in response to the second display region corresponding to a blank space. For example, referring to FIG. 1C, the electronic device 20 may adjust the calibration parameter 28 in response to the measured gaze position 82 pointing to a blank space where no visual element is being displayed. When the device displays visual elements, the user is expected to gaze at one or more of the displayed visual elements and not blank space. As such, when gaze tracking indicates that the user is gazing at a blank space when the device is displaying visual elements, the gaze tracking is likely generating erroneous measured gaze targets and may be improved by adjusting the calibration parameter.

As represented by block 350f, in some implementations, adjusting the calibration parameter includes adjusting the calibration parameter in response to the first display region having a first saliency value that is greater than a second saliency value of the second display region. In some implementations, the user is expected to gaze at a visual element with the greatest saliency value. For example, referring to FIG. 1B, the electronic device 20 may select a location corresponding to the second visual element 50b as the expected gaze position 72 in response to a saliency value of the second visual element 50b being greater than saliency values of the remaining visual elements 50a, 50c and 50d.

In some implementations, the method 300 includes determining the expected gaze target based on the measured gaze target. In some implementations, the measured gaze target indicates that the user's gaze is directed to a portion of an object that is within a threshold distance of a center of the object. For example, the measured gaze target may indicate that the user is gazing towards an edge of a button instead of a center of the button. In various implementations, the user is expected to gaze at or towards a center of an object. For example, the user is expected to gaze at or near a center of a button. In such implementations, the method 300 includes determining that the expected gaze position corresponds to a center of an object that the user is measuredly gazing.

Figure 4:
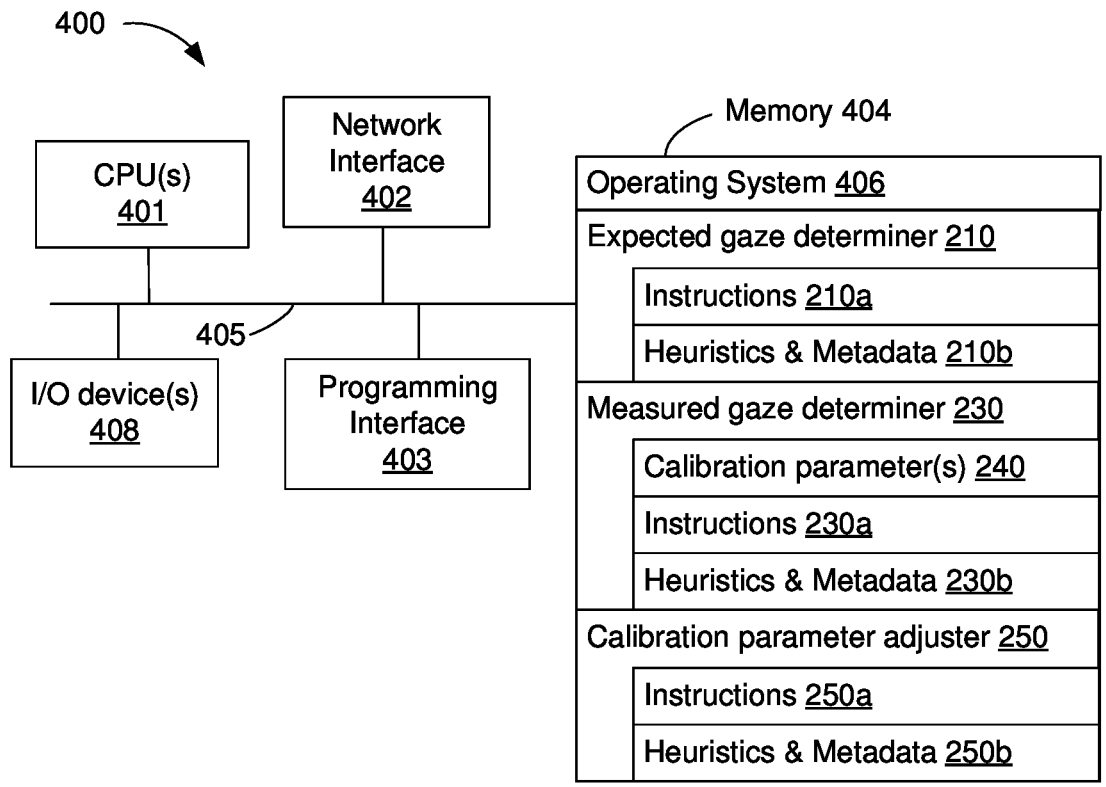
FIG. 4 is a block diagram of a device that adjusts a calibration parameter of a gaze tracker in accordance with some implementations.

FIG. 4 is a block diagram of a device 400 in accordance with some implementations. In some implementations, the device 400 implements the electronic device 20 shown in FIGS. 1A-1J and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 304 comprises a non-transitory computer readable storage medium.

In some implementations, the memory 404 or the non-transitory computer readable storage medium of the memory 404 stores the following programs, modules and data structures, or a subset thereof including an optional operating system 406, the expected gaze determiner 210, the measured gaze determiner 230 and the calibration parameter adjuster 250. In various implementations, the device 400 performs the method 300 shown in FIG. 3.

In some implementations, the expected gaze determiner 210 includes instructions 210a, and heuristics and metadata 210b for determining an expected gaze target (e.g., the expected gaze target 70 shown in FIG. 1B and/or the expected gaze target 212 shown in FIG. 2). In some implementations, the expected gaze determiner 210 performs at least some of the operation(s) represented by block 320 in FIG. 3.

In some implementations, the measured gaze determiner 230 includes instructions 230a, and heuristics and metadata 230b for determining a measured gaze target (e.g., the measured gaze target 80 shown in FIG. 1C and/or the measured gaze target 234 shown in FIG. 2) in accordance with values of the calibration parameters 240. In some implementations, the measured gaze determiner 230 performs at least some of the operation(s) represented by block 340 in FIG. 3.

In some implementations, the calibration parameter adjuster 250 includes instructions 250a, and heuristics and metadata 250b for adjusting the calibration parameter(s) 240 (e.g., the calibration parameter 28 shown in FIG. 1A). In some implementations, the calibration parameter adjuster 250 performs at least some of the operation(s) represented by block 350 in FIG. 3.

In some implementations, the one or more I/O devices 408 include an input device for obtaining an input (e.g., the user input 110 shown in FIG. 1F). In some implementations, the input device includes a touchscreen (e.g., for detecting tap inputs), an image sensor (e.g., for detecting gesture inputs) and/or a microphone (e.g., for detecting voice inputs). In some implementations, the one or more I/O devices 408 include an image sensor (e.g., a user-facing camera, for example, an eye tracking camera) for capturing images of a pupil of the user (e.g., for capturing the image 78 shown in FIG. 1C, the image 98 shown in FIG. 1E, and/or the image(s) 232 shown in FIG. 2). In some implementations, the one or more I/O devices 408 include a display for displaying the visual elements.

In various implementations, the one or more I/O devices 408 include a video pass-through display which displays at least a portion of a physical environment surrounding the device 400 as an image captured by a camera. In various implementations, the one or more I/O devices 408 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Implementations described herein contemplate the use of gaze information to present salient points of view and/or salient information. Implementers should consider the extent to which gaze information is collected, analyzed, disclosed, transferred, and/or stored, such that well-established privacy policies and/or privacy practices are respected. These considerations should include the application of practices that are generally recognized as meeting or exceeding industry requirements and/or governmental requirements for maintaining the user privacy. The present disclosure also contemplates that the use of a user's gaze information may be limited to what is necessary to implement the described embodiments. For instance, in implementations where a user's device provides processing power, the gaze information may be processed at the user's device, locally.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
    at a device including a display, an image sensor, a non-transitory memory and one or more processors coupled with the display, the image sensor and the non-transitory memory:
        displaying, on the display, a graphical user interface (GUI) including a plurality of selectable GUI elements;
        determining, based on respective characteristic values of the plurality of selectable GUI elements, an expected gaze target that indicates a first display region where a user of the device intends to gaze while the plurality of selectable GUI elements is being displayed in response to a user input;
        obtaining, via the image sensor, an image that includes a set of pixels corresponding to a pupil of the user of the device;
        determining, by a gaze tracker, based on the set of pixels corresponding to the pupil, a measured gaze target that indicates a second display region where the user is measuredly gazing; and
        adjusting a calibration parameter of the gaze tracker based on a difference between the first display region indicated by the expected gaze target and the second display region indicated by the measured gaze target while selecting a respective selectable GUI element from the displayed plurality of selectable GUI elements in response to the user input without prompting a guided calibration.

2. The method of claim 1, wherein respective characteristic values corresponding to the user input include respective saliency values.

3. The method of claim 1, wherein respective characteristic values corresponding to the user input include position values that indicate respective placements of the plurality of selectable GUI elements.

4. The method of claim 1, wherein respective characteristic values corresponding to the user input include color values that indicate respective colors of the plurality of selectable GUI elements.

5. The method of claim 1, wherein respective characteristic values corresponding to the user input include movement values that indicate respective speeds at which the plurality of selectable GUI elements are moving.

6. The method of claim 1, wherein respective characteristic values corresponding to the user input indicate respective levels of interactions between the user and the plurality of selectable GUI elements.

7. The method of claim 1, wherein adjusting the calibration parameter comprises adjusting the calibration parameter when a distance between the first display region and the second display region is greater than a threshold.

8. The method of claim 1, wherein the adjustment to the calibration parameter is proportional to a distance between the first display region and the second display region.

9. The method of claim 1, wherein adjusting the calibration parameter comprises recording a change in a position of the pupil from a first expected position to a second expected position.

10. The method of claim 1, wherein the expected gaze target is associated with a confidence score, and wherein adjusting the calibration parameter comprises:
    adjusting the calibration parameter in response to the confidence score being greater than a threshold confidence score; and
    forgoing adjustment of the calibration parameter in response to the confidence score being less than the threshold confidence score.

11. The method of claim 10, wherein the confidence score is a function of a density of the plurality of selectable GUI elements.

12. The method of claim 10, wherein the confidence score is a function of a distance between the first display region and the second display region.

13. The method of claim 1, wherein adjusting the calibration parameter comprises adjusting the calibration parameter in response to device movement data indicating that the device has moved more than a threshold amount since a previous adjustment to the calibration parameter.

14. The method of claim 1, wherein the plurality of selectable GUI elements includes a moving selectable GUI element that the user is expected to gaze at;
wherein the expected gaze target corresponds to a position of the moving selectable GUI element; and
wherein the measured gaze target indicates a position that is offset from the position of the moving selectable GUI element.

15. The method of claim 1, wherein the plurality of selectable GUI elements includes a selectable affordance that the user is expected to gaze at while selecting the selectable affordance;
wherein the expected gaze target corresponds to a position of the selectable affordance; and
wherein the measured gaze target indicates a position that is offset from the position of the selectable affordance.

16. The method of claim 1, wherein adjusting the calibration parameter comprises adjusting the calibration parameter in response to the second display region corresponding to a blank space.

17. The method of claim 1, wherein adjusting the calibration parameter comprises adjusting the calibration parameter in response to the first display region having a first saliency value that is greater than a second saliency value of the second display region.

18. The method of claim 1, wherein the expected gaze target is determined based on the measured gaze target when a selection input is received.

19. A device comprising:
one or more processors;
an image sensor;
a display;
a non-transitory memory; and
one or more programs stored in the non-transitory memory, which, when executed by the one or more processors, cause the device to:
display, on the display, a graphical user interface (GUI) including a plurality of selectable GUI elements;
determine, based on respective characteristic values of the plurality of selectable GUI elements, an expected gaze target that indicates a first display region where a user of the device intends to gaze while the plurality of selectable GUI elements is being displayed in response to a user input;
obtain, via the image sensor, an image that includes a set of pixels corresponding to a pupil of the user of the device;
determine, by a gaze tracker, based on the set of pixels corresponding to the pupil, a measured gaze target that indicates a second display region where the user is measuredly gazing; and
adjust a calibration parameter of the gaze tracker based on a difference between the first display region indicated by the expected gaze target and the second display region indicated by the measured gaze target while selecting a respective selectable GUI element from the displayed plurality of selectable GUI elements in response to the user input without prompting a guided calibration.

20. A non-transitory memory storing one or more programs, which, when executed by one or more processors of a device including a display and an image sensor, cause the device to:
display, on the display, a graphical user interface (GUI) including a plurality of selectable GUI elements;
determine, based on respective characteristic values of the plurality of selectable GUI elements, an expected gaze target that indicates a first display region where a user of the device intends to gaze while the plurality of selectable GUI elements is being displayed in response to a user input;
obtain, via the image sensor, an image that includes a set of pixels corresponding to a pupil of the user of the device;
determine, by a gaze tracker, based on the set of pixels corresponding to the pupil, a measured gaze target that indicates a second display region where the user is measuredly gazing; and
adjust a calibration parameter of the gaze tracker based on a difference between the first display region indicated by the expected gaze target and the second display region indicated by the measured gaze target while selecting a respective selectable GUI element from the displayed plurality of selectable GUI elements in response to the user input without prompting a guided calibration.

\* \* \* \* \*